(12) United States Patent
Logan et al.

(10) Patent No.: US 7,931,806 B2
(45) Date of Patent: Apr. 26, 2011

(54) WASTEWATER TREATMENT METHOD AND APPARATUS, BIOSOLIDS-BASED FOOD ADDITIVE, AND BUSINESS APPLICATION

(75) Inventors: Andrew J. Logan, Denver, CO (US); Seth Sprague Terry, Englewood, CO (US); Randy Swenson, Englewood, CO (US)

(73) Assignee: Oberon Frm, Inc., Idaho Springs, CO (US)

( * ) Notice: Subject to any disclaimer, the term of this patent is extended or adjusted under 35 U.S.C. 154(b) by 0 days.

(21) Appl. No.: 12/262,971

(22) Filed: Oct. 31, 2008

(65) Prior Publication Data

US 2009/0114602 A1 May 7, 2009

Related U.S. Application Data

(60) Provisional application No. 60/984,653, filed on Nov. 1, 2007.

(51) Int. Cl.
  *C02F 3/00* (2006.01)
(52) U.S. Cl. ........ 210/609; 210/220; 210/612; 210/613; 210/610; 210/611; 210/614; 210/138; 210/143; 210/150; 210/151; 435/71.1; 435/804; 705/1.1; 705/308
(58) Field of Classification Search .................. 210/609, 210/220, 610–614, 138, 143, 150–151; 435/71.1, 435/804; 705/1.1, 308
See application file for complete search history.

(56) References Cited

U.S. PATENT DOCUMENTS

| | | | |
|---|---|---|---|
| 4,119,495 A | | 10/1978 | Belyaev et al. |
| 4,137,167 A | * | 1/1979 | Kenyon et al. ............... 210/785 |
| 4,282,256 A | | 8/1981 | Evich et al. |
| RE30,965 E | * | 6/1982 | Hitzman ..................... 435/71.2 |
| 4,728,517 A | * | 3/1988 | Markham et al. ............... 426/53 |
| 6,161,305 A | * | 12/2000 | Maier et al. ..................... 34/315 |
| 2003/0232107 A1 | | 12/2003 | Terry et al. |
| 2004/0203134 A1 | | 10/2004 | Pyntikov et al. |
| 2005/0124053 A1 | | 6/2005 | Moen et al. |
| 2005/0271771 A1 | | 12/2005 | Moen et al. |
| 2006/0060525 A1 | | 3/2006 | Hoffland |

OTHER PUBLICATIONS

Knocke, William, et al., "Effects of mean cell residence time and particle size distribution on activated sludge vacuum dewatering characteristics," Journal of the Water Pollution Control Federation, vol. 58, No. 12 (Dec. 1986), pp. 1118-1123.*

International Search Report based on International Application No. PCT/US2008/082029 (Apr. 2, 2009).

Tacon and Ferns, Activated Sewage Sludge: A Potential Animal Foodstuff 1: Proximate and Mineral Content: Seasonal Variation, Agric. Environ. vol. 4 (1978/1979) pp. 257-269.

Tacon, The Use of Activated Sludge-Single Cell Protein (ASCP) Derived from the Treatment of Domestic Sewage in Trout Diets, Proc. World Symp. on Fishfin Nutrit. Hamburg, Jun. 20-23 1978, Vol. II (1979).

Edwards, Reuse of Human Wastes in Aquaculture: A Technical Review, UNDP-World Bank Water and Sanitation Program (1992).

(Continued)

*Primary Examiner* — Chester T Barry
(74) *Attorney, Agent, or Firm* — Cooley LLP

(57) ABSTRACT

The present invention is directed to processes and business methods and wastewater treatment units for converting the waterborne residuals from wastewater generated by food processing plants into an ingredient suitable for use in animal feeds. The ingredient produced by the processes of the present invention has a high protein content and can be used as a replacement for conventional sources of animal feed protein such as fish meal.

46 Claims, 6 Drawing Sheets

OTHER PUBLICATIONS

Tacon, Activated Sewage Sludge: A Potential Animal Foodstuff 2: Nutritional Characteristics, Agric. Environ. vol. 4 (1978/1979) pp. 271-279.

Anwar et al., Activated Sewage Sludge as a Replacement for Bran-Cottonseed Meal Mixture for Carp, *Cyprinus Carpid*, Aquaculture, vol. 28 (1982) pp. 321-325.

Litchfield, Microbial Protein Production, Bioscience vol. 30 (1980) pp. 387-396.

Vriens, Activated Sludges as Animal Feed: A Review, Biol. Wastes, vol. 27 (1989) pp. 161-207.

Watson and Pauly, Systematic Distortions in World Fisheries Catch Trends, Nature, vol. 414 (2001) pp. 534-536.

Myers and Worm, Rapid Worldwide Depletion of Predatory Fish Communities, Nature, vol. 423 (2003) pp. 280-283.

Special Report: The Global Fish Crisis, National Geographic, vol. 211 (2007) pp. 32-99.

\* cited by examiner

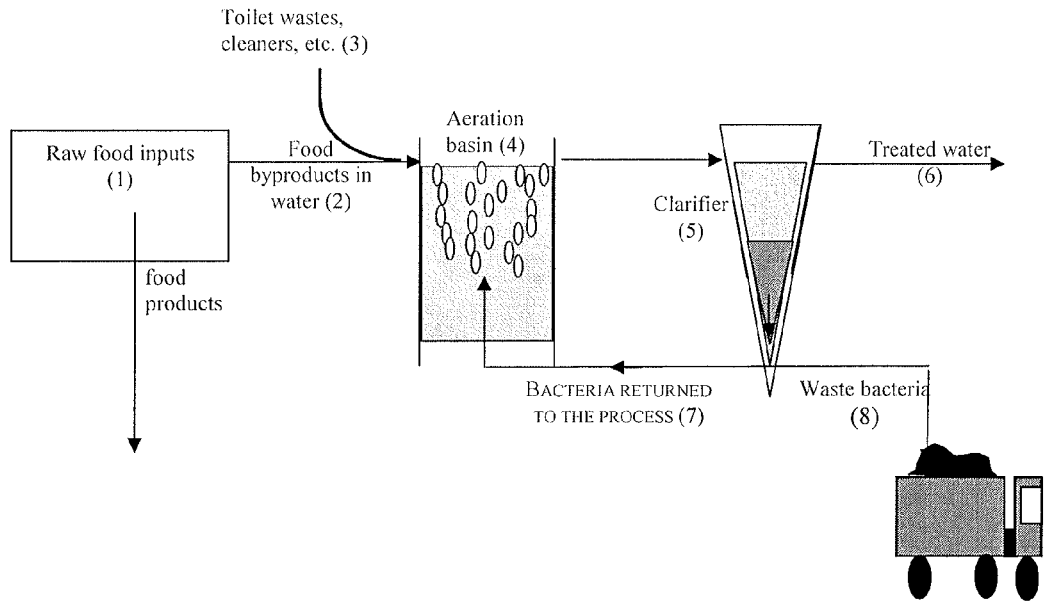
Figure 1. Conventional wastewater treatment process for the food-processing industry. PRIOR ART
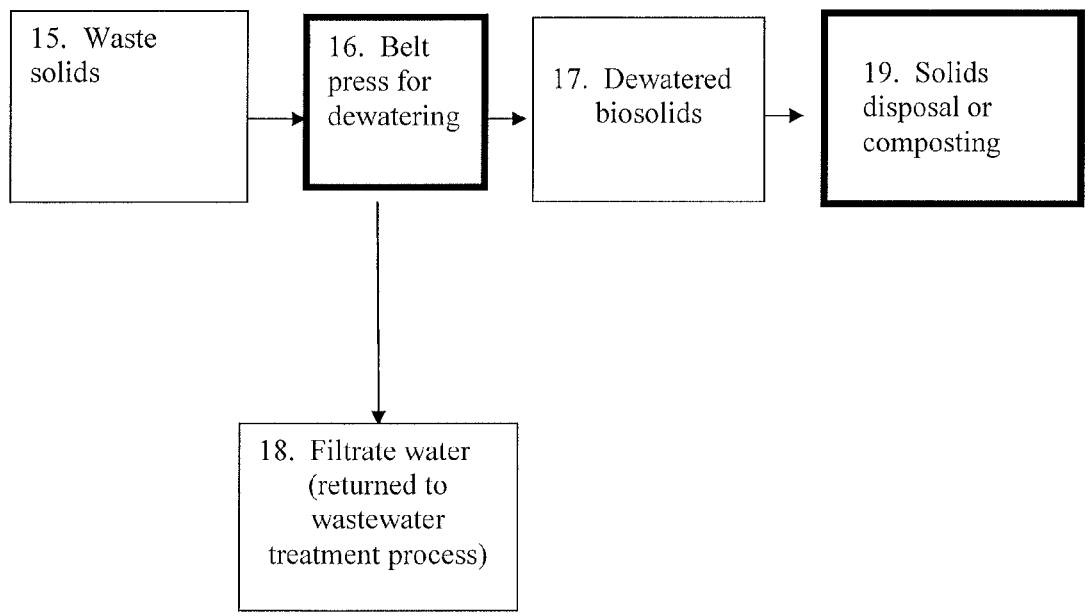
Figure 2. Schematic diagram of Dewatering and Disposal of Waste Biosolids. PRIOR ART

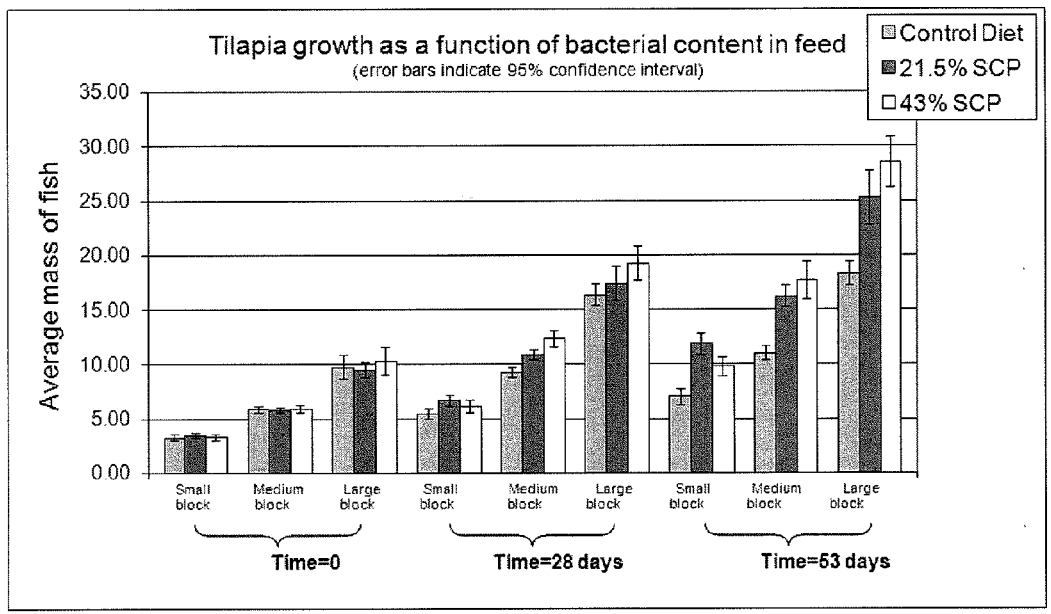

Figure 9. Growth rates for *Oreochromis niloticus* fed a control diet or single cell protein-containing diets (SCP) derived from potato wastes at 21.5% and 43% concentrations (mass basis) in final feed.

| Sample name | Kjeldahl nitrogen (g/kg) ± 95% confidence interval | Ash (g/kg) ± 95% confidence interval | Total Fat (g/kg) ± 95% confidence interval |
|---|---|---|---|
| Control diet (all samples) | 25.9 ± 0.86 | 33.9 ± 2.2 | 68.2 ± 14.77 |
| 21.5% diet (all samples) | 25.4 ± 0.73 | 29.3 ± 1.7 | 81.9 ± 12.79 |
| 43% diet (all samples) | 26.8 ± 0.60 | 38.8 ± 2.3 | 66.2 ± 4.04 |

Figure 10. Whole body analyses of Tilapia fed the control, 21.5% SCP, or 43% SCP diets.

WASTEWATER TREATMENT METHOD AND APPARATUS, BIOSOLIDS-BASED FOOD ADDITIVE, AND BUSINESS APPLICATION

CROSS-REFERENCE TO RELATED APPLICATIONS

This application claims priority to U.S. Provisional Application No. 60/984,653, filed Nov. 1, 2007, which is incorporated herein by reference in its entirety for all purposes.

FIELD OF THE INVENTION

This invention relates to a process for preparing a proteinaceous animal feed or animal feed additive from microorganisms grown in wastewater streams containing organic matter, a wastewater treatment unit for carrying out the process of the present invention, and business methods therefor.

BACKGROUND OF THE INVENTION

Commercial food supplies for animals (e.g., birds, fish, cattle, etc.) consist of nutrients (e.g., protein, vitamins, minerals, fats, and carbohydrates), for example raw ingredients or food additives that may include whole, unprocessed food materials (e.g., meat or plants), marginally processed foods (e.g., fish meal, soy meal, nut meal, etc.), and waste by-products generated in the production of other food (e.g., wheat middlings, bone meal, blood meal, feather meal, etc.). One of the main motivations for employing alternative food additives in feed formulations is to reduce the cost of the protein component. Fish meal provides a common source of protein for animal food, particularly in the aquaculture, pig, poultry, and pet food industries. However, there are many drawbacks to the use of fish meal as a food additive. The continued growth of the demand for fish meal from global aquaculture operations places excessive strain on world fisheries, and may deplete wild fish stocks due to over-fishing. Several recent scientific journal and popular media articles point to an emerging consensus regarding decreased landings of wild fish, and the potential impending collapse of economically and ecologically vital fish stocks (see for example Watson and Pauley, *Nature*, vol. 414 (2001), pp. 534-536; Myers and Worm, *Nature*, vol. 423 (2003), pp. 280-283; and Special Report: The Global Fish Crisis, *National Geographic*, vol. 211. no. 4 (2007), pp. 32-99). In addition, seasonal fluctuations and meteorological events (e.g., El Niño, La Niña) influence market prices for fish meal.

Alternative by-product protein sources (such as bone, blood, and meat by-products) have been used in animal food industries in an effort to reduce reliance on fish meal as a protein source. However, there are concerns that such protein sources may compromise animal and human health, for example by causing the spread of "wasting" diseases, such as bovine spongiform encephalopathy (aka mad cow disease) and scrapie.

Vegetable products (such as soy and wheat) and monocultures (or well characterized mixed communities) of single-cell (i.e., microbial) protein sources have been evaluated as food additives. For example, microorganisms have been grown on substrates including natural gas (e.g., Norferm's currently abandoned Bioprotein® product, for example as described in U.S. Patent Publ. Nos. 2005/0124053 and 2005/0271771). Additional organisms that may be incorporated into animal food include algae, yeast, and zooplankton. An extreme example of alternative animal food sources is found in some developing-world aquaculture operations where the feces of pigs, ducks, cows, humans, and other animals have been utilized as a feed in order to recover the nutritional value remaining in these waste products. However, the use of such products as a feed may compromise animal (or human) health or impart an undesirable taste to the meat of animals fed in this manner.

Thus, raw material inputs for producing conventional animal foods draw from various sources, either directly from natural sources or derived as by-products from the manufacture of other food products. The incorporation of sufficient protein into the ultimate animal food is a major manufacturing goal, and greatly influences the total cost of producing animal feedstocks. Increasingly, food producers, particularly in the aquaculture and domesticated animal food industries, have utilized fish meal harvested from various natural fisheries. However, this dependence has led to concerns about the depletion of natural resources.

As discussed above, animal foods can be supplemented with waste-by-products derived from the production of human or animal foods or ingredients for animal or human foods. The term "human or animal foods" includes any food or beverage for human or animal consumption, as well components of human or animal foods (e.g., corn syrup, molasses, etc.). Food production processes can produce waste streams containing "solid matter residuals" (i.e., solid waste streams) or "waterborne residuals" (i.e., dissolved and particulate waste matter entrained in water). When by-products are used in the production of another salable product (such as animal feed), the process is commonly referred to as co-production. For example, fish meal is the product of processed whole food (school fish such as menhaden, anchovies, sardines, etc.) or food processing residuals (fish heads, bones, internal organs), while wheat middlings (a solid matter residual) are a co-product food additive which can be used as an ingredient in animal food. Further examples of solid matter residuals used in animal foods include waste hops, barley, and yeast from breweries (e.g., for cattle, horses, and chickens).

Waterborne residuals are generally treated in wastewater treatment plants, where contaminants from the aqueous waste streams (i.e., wastewater) are removed prior to the ultimate disposal of the treated waste water in a receiving water body or another wastewater treatment plan (e.g., a river or a larger wastewater treatment plant). Waterborne residuals can also be subjected to pretreatment in which the wastewater producer partially treats the wastewater to remove at least a portion of the waterborne residuals prior to sending the wastewater to another wastewater treatment plant (e.g. a municipal wastewater treatment plant). Wastewater can derive from industrial processes (such as a food processing facility, where sewage inputs are not necessarily present) and domestic sources (such as a municipality, where sewage inputs are primary contributors to overall flow). The most common contaminants present in wastewater include soluble, carbon-containing (i.e., organic) compounds that contribute to biochemical oxygen demand (BOD). BOD is a measure of the oxygen required for biological degradation of the contaminants in water or wastewater and is generally correlated to the amount of waterborne organic material contained in that wastewater. In other words, the greater the organic matter content of a wastewater, the greater will be the BOD level determined for that wastewater. In order to meet most regulatory standards in the United States, BOD levels should generally fall below about 30 mg/L prior to discharge to a receiving water body. Influent wastewaters to wastewater treatment plants may vary greatly with regard to their BOD concentrations and biochemical characteristics. For example, food-producing facilities may generate wastewaters containing BOD levels in excess of 30,000 mg/L while wastewater treatment plants processing municipal sewage generally receive wastewater averaging between approximately 200 mg/L and 400 mg/L. Furthermore, wastewater may contain BOD-contributing compounds having a wide range of chemical structures and molecular weights.

Many wastewater treatment processes rely upon the biological conversion of a BOD substrate into a cellular mass. In some cases—particularly in the food industry—biological treatment processes may prove difficult to implement as the result of nutrient limitations (e.g., due to the presence of nitrogen, phosphate, or some other essential nutritional component in concentrations insufficient to promote the balanced growth of microbial cells). Balanced growth in bacteria means that sufficient quantities of nutrients are both present and biologically available at the time that the organisms in the organic substrate come into contact. The simultaneous presence of substrate and nutrients allows bacteria to produce the molecular components most generally associated with cellular growth, specifically protein, nucleic acids, and lipids. When sufficient quantities of nutrients (including both so-called "macronutrients" such as nitrogen and phosphorus, and so-called "micronutrients" such as metals and vitamins) are not present, bacteria experience non-balanced growth. In contrast to balanced growth, non-balanced growth is characterized by the increased production of polysaccharide material about the cell—a process by which carbon atoms are sequestered away from the molecules involved with cellular growth (e.g., proteins, nucleic acids, and lipids).

FIG. 1 provides a schematic for a typical type of wastewater treatment plant using a biological treatment process. Influent wastewater containing food byproducts 1 is introduced to the treatment process (FIG. 1). Although plant designs may vary, the essential biological wastewater treatment process involves contacting microorganisms (especially bacteria) with waterborne organic material (i.e., BOD) in the wastewater. Commonly, this contact occurs in an aeration basin (or series of basins) 4 in which oxygen is introduced to maintain aerobic conditions. The microorganisms metabolize the waterborne residuals contained in the wastewater, thereby utilizing available energy (in the form of reduced carbon compounds) contained therein. In the process of meeting cellular metabolic needs, including maintenance and growth (i.e., cellular proliferation), residual matter (i.e., BOD-contributing compounds) in the wastewater is metabolized and converted into microbial mass. In order to separate treated water from this solid microbial mass (aka solids), the contents of the aeration basin(s) 4 can be allowed to settle in a clarifier basin 5 (it will be understood that other types of separation equipment could be substituted for a clarifier basin). A portion of the separated solids (i.e., containing bacteria) 7 is then returned to the aeration basin(s) 4 to maintain a high concentration of organisms therein. In order to maintain quasi-steady state conditions, those solids not returned to the aeration basin must be "wasted" (i.e., removed) 8 from the treatment process. These wasted solids are commonly referred to as waste activated sludge (WAS). Therefore, as a result of biological wastewater treatment processes, the aqueous residuals (i.e., BOD-contributing compounds) in the influent wastewater stream are largely incorporated into cellular solids that ultimately must exit the treatment process while the treated water 6 (with greatly reduced BOD levels) is discharged to a receiving water body. Removed cellular solids (i.e., WAS) are collected and disposed of in a variety of ways, most commonly after partially removing the intracellular water (i.e., dewatering) in a dewatering process.

FIG. 2 outlines one conventional process for dewatering and disposal of this cellular material. Waste solids 15 are applied to a belt filter press 16 that partially removes the intracellular water contained therein. This method of dewatering is one of several conventional methods, which can include centrifugation, drying, various types of filter presses, etc. Upon introduction to the belt press, the solids content in WAS is often less than approximately 3% solids on a percent by weight basis. However, at the completion of belt-press dewatering, the solids content in the resulting filter-cake (comprised of partially dewatered biological solids, aka biosolids) 17 is often between about 15% and about 20% solids. The intracellular water removed during dewatering (i.e., filtrate) is normally returned to the wastewater treatment process 18. The partially dewatered solids must then undergo a solids disposal process 19. These disposal options are generally costly to the producer of the biosolids material, primarily due to the high cost of transportation and tipping. As a result, biosolids producers often process the biosolids before and after dewatering to decrease the volume of material for disposal. Such processes include aerobic and anaerobic digestion—to convert particulate carbon matter (i.e., solids that would otherwise require disposal) to gaseous forms such as carbon dioxide and methane. These volatile components may be either released directly to the atmosphere or burned, thereby decreasing the amount of solids material requiring disposal. Other processes for decreasing the quantity of biosolids requiring dewatering include anaerobic biological treatment processes in which decreased cellular material is produced from the energy-containing BOD.

Other alternatives for disposing of biosolids from wastewater treatment plants (i.e., WAS) include ocean dumping, incineration, land-filling, and land-application. However, ocean dumping has become increasingly more regulated and costly due to concerns about contaminating the environment. Similar concerns have led many wastewater treatment plants to move away from WAS incineration due both to regulatory concerns and to the high energy input required. Land-filling of WAS is also problematic since most facilities will not accept wet matter. Likewise, land-application of WAS can engender strong community resistance and strict regulatory controls due to concerns over pathogenic organism dispersal (for example, regulatory requirements for composting processes require careful temperature monitoring to ensure de-activation—i.e., killing—of the microorganisms comprising the biosolids).

Due to these concerns, the composting of biosolids has become a more attractive method for disposing of waste microorganisms derived from wastewater treatment processes. As a result of proper implementation of composting procedures, wastewater treatment plants may even be able to generate modest incomes by selling compost material (generally referred to as "Class A biosolids" see 40 C.F.R. §503). Alternatively, thermally dewatered biosolids have also been sold as fertilizers and soil conditioners (e.g., Milorganite® fertilizer and soil conditioner, a product manufactured by the Milwaukee Metropolitan Sewerage District).

U.S. Pat. No. 4,119,495 describes extracting protein from hydrolyzed WAS to provide a nutrient source for culturing other microorganisms, such as yeast, or as a protein additive for feeding animals. However, this process involves costly pH and temperature adjustments in order to recover microbial protein. Other researchers have evaluated using the activated sludge component from domestic wastewater treatment processes as a foodstuff, but as yet no large-scale commercial process for so doing has been implemented (Anwar et al., *Aquaculture*, vol. 28 (1982) pp. 321-325; Tacon and Ferns,

*Agriculture and Environment*, vol. 4 (1978/1979) pp. 257-269; Tacon and Ferns, *Nutrition Reports International*, vol. 13 (1976) pp. 549-562; Tacon, *Proc. World Symp. On Finfish Nutrition and Fishfeed Technology*, Hamburg 20-23 Jun. 1978, Vol. II. Berlin 1979; Edwards, 1992, *Reuse of Human Wastes in Aquaculture: A Technical Review*, UNDP-World Bank Water and Sanitation Program).

BRIEF SUMMARY OF THE INVENTION

In one embodiment, the present invention is directed to a process comprising: adding an aqueous waste stream comprising metabolizable components to a growth vessel containing at least one bacterial culture, at a first flow rate; allowing the bacteria of the at least one bacterial culture to grow in the growth vessel by metabolizing at least a portion of the metabolizable components of the aqueous waste stream, thereby forming a bacterial suspension in an aqueous bulk liquid, wherein the aqueous bulk liquid is depleted of metabolizable components relative to the aqueous waste stream; separating a portion of the bacterial suspension from the aqueous bulk liquid, thereby forming a bacterial mass; removing a portion of the bacterial mass at a second flow rate; returning a portion of the bacterial mass to the growth vessel at a third flow rate; removing a portion of the aqueous bulk liquid at a fourth flow rate, wherein the aqueous bulk liquid is substantially free of total suspended solids; adjusting the second flow rate to provide a MCRT of the bacteria of no more than about 8 days; and drying the removed bacterial mass within a time period whereby MWRT−MCRT≦ about 2 days.

In another embodiment, the present invention is directed to a wastewater treatment unit comprising: a growth vessel; means for adding an aqueous waste stream comprising metabolizable components to the growth vessel; at least one bacterial culture in the growth vessel, which metabolizes at least a portion of the metabolizable components of the aqueous waste stream, thereby forming a bacterial suspension in an aqueous bulk liquid, wherein the aqueous bulk liquid is depleted of metabolizable components relative to the aqueous waste stream; means for aerating the bacterial suspension and aqueous bulk liquid in the growth vessel; means for separating a portion of the bacterial suspension from the aqueous bulk liquid, thereby forming a bacterial mass; means for removing the bacterial mass from the wastewater treatment unit; means for adjusting the rate at which the bacterial mass is removed to provide a MCRT of the bacteria in the wastewater treatment unit of no more than about 8 days; means for removing a portion of the aqueous bulk liquid from the wastewater treatment unit, wherein said aqueous bulk liquid is substantially free of total suspended solids; means for drying the removed bacterial mass; and means for adjusting the time period in which the removed bacterial mass is dried whereby MWRT−MCRT≦ about 2 days.

A method comprising: receiving an aqueous waste stream from a food and/or beverage processing plant comprising dissolved or suspended metabolizable food and/or beverage byproducts with BOD levels of ≧ about 100 mg/L; adding the aqueous waste stream comprising metabolizable components to a growth vessel containing at least one bacterial culture, at a first flow rate; allowing the bacteria of the at least one bacterial culture to grow in the growth vessel by metabolizing at least a portion of the metabolizable components of the aqueous waste stream, thereby forming a bacterial suspension in an aqueous bulk liquid, wherein the aqueous bulk liquid is depleted of metabolizable components relative to the aqueous waste stream; separating a portion of the bacterial suspension from the aqueous bulk liquid, thereby forming a bacterial mass; removing the bacterial mass at a second flow rate; removing a portion of the aqueous bulk liquid at a third flow rate, wherein the aqueous bulk liquid is substantially free of total suspended solids and has a BOD within permitted levels; adjusting the second flow rate to provide a MCRT of the bacteria of no more than about 8 days; drying the removed bacterial mass within a time period whereby MWRT−MCRT≦about 2 days; and providing the dried bacterial mass as a protein source for animal feed.

A composition comprising: a bacterial mass comprising a mixture of bacteria, wherein said bacteria are selected from the group consisting of genetically modified bacteria, Micrococci, Bacilli, Flavobacteria, methanogens, Pseudomona, Nitrosomona, Nitrobacteri, Alcaligenes, nitrifying bacteria, aerobic heterotrophs, and combinations thereof; wherein said bacterial mass has a protein content of 45% or greater.

Apparatus and methods for processing an aqueous waste stream are described herein. In some embodiments, a method includes receiving a first signal associated with a quantity of a first portion of a bacterial mass within a waste water treatment system. In some embodiments, the first signal can be proportional to a flow rate of a waste stream entering the waste water treatment system. The first portion of the bacterial mass is contained within a first portion of an aqueous bulk liquid within the waste water treatment system. A total cell mass of the bacterial mass within the waste water treatment system is calculated based on at least the first signal. A second signal associated with a quantity of a second portion of the bacterial mass is received. The second portion of the bacterial mass is contained within a second portion of the aqueous bulk liquid, which is exiting the waste water treatment system at a flow rate. The method then includes calculating a mean cell retention time of the bacterial mass within the waste water treatment system based on the total cell mass of the bacterial mass within the waste water treatment system and the second signal. The flow rate of the second portion of the aqueous bulk liquid is adjusted such that the mean cell retention time of the bacterial mass within the waste water treatment system is within a predetermined range. The predetermined range can be, for example, a time period between approximately two days and approximately eight days.

BRIEF DESCRIPTION OF THE DRAWINGS

FIG. 1 is a schematic of a conventional wastewater treatment plants using a biological process.

FIG. 2 is a schematic of a conventional process for dewatering and disposing of WAS.

FIG. 9 illustrates actual growth data for fish fed with food containing single cell protein.

FIG. 10 illustrates full-bodied analyses of tilapia fed food supplemented with single cell protein.

DETAILED DESCRIPTION OF THE INVENTION

Figure 3:
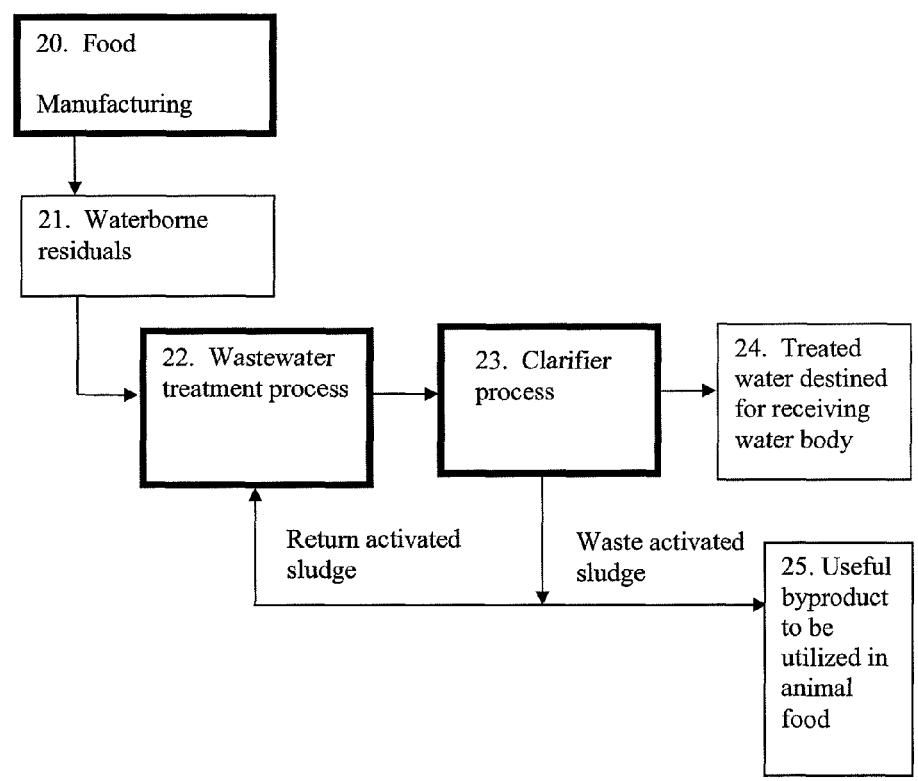
FIG. 3 is a schematic of the process of the present invention.

All documents cited are incorporated herein by reference in their entirety for all purposes; the citation of any document is not to be construed as an admission that it is prior art with respect to the present invention.

The terms "waste activated sludge" (WAS), "cellular mass", "bacterial mass", and "bacterial cellular mass" are used interchangeably herein to refer to a relatively concentrated mass of microorganisms.

The terms "nutrients", metabolizable components", "carbon-containing compounds" are used interchangeably to refer to organic compounds that an organism needs to live and grow.

In one embodiment, the present invention is directed to a process for preparing a dried bacterial mass suitable for use as a protein source, e.g. in animal feeds, particularly feeds for animals raised for human consumption such as in aquaculture.

More specifically, the present invention is directed to a process in which wastewater from the waste streams of food or beverage processing plants is used as a growth medium for single celled organisms (e.g., bacteria) which are then harvested as inexpensive cost effective protein source suitable for use in animal feeds. Wastewater from food or beverage in processing plants can be characterized by its BOD level, which generally correlates to the amount of waterborne organic material in the wastewater. As discussed above, in order to meet wastewater discharge regulations food and beverage processing plants often rely on biological conversion of the organic material in the wastewater to reduce the BOD to within the regulated level. However, the bacterial mass formed and removed during the biological conversion process (i.e., WAS) is typically discarded by any of a variety of methods discussed above. Thus, food processors incur the cost of operating the wastewater treatment process as well as discarding the WAS. In order to minimize the WAS disposal costs (which are typically based on the weight or volume of the WAS), the WAS is typically "digested" (i.e., using endogenous decay to break down the bacterial mass into volatile compounds). While this reduces the volume of the solid waste stream, the protein content of the digested WAS is also degraded.

As in conventional wastewater treatment processes, the process of the present invention also provides for the biological treatment of the organic material present in the wastewater from a food or beverage processing plant, thereby reducing the BOD of the wastewater to levels that meet discharge regulations. However, the treatment process of the present invention differs from that of conventional waste treatment processes in that it is controlled, as described herein, to maximize the protein level in the bacterial mass produced in and removed from the treatment process.

Furthermore, rather than digesting the bacterial mass, the process of the present invention provides for drying the bacterial mass almost immediately after removal in order to preserve and to maximize the protein content and quality therein. The dried biosolids removed from conventional waste treatment processes may have ash percentages in excess of 35%. Since ash comprises refractory material (generally inorganic) that animals cannot fully metabolize, it is desirable to reduce ash production by modifying the operating conditions in the wastewater treatment plant. In conventional wastewater treatment processes, the production of biosolids is viewed as somewhat of a liability since it must be disposed of as waste. Even if it is further treated to produce a commercial product (e.g., compost material) such products are of relatively low value. Accordingly, WAS is typically digested (i.e., stored for days or weeks under either aerobic or anaerobic conditions) in order to convert some fraction of the solids mass to various gasses and soluble metabolites, which reduces the organic mass of the WAS. This enables a conventional treatment facility to reduce the volume of biosolids requiring disposal, thereby reducing disposal costs. However, relatively easily digested compounds (such as proteins and lipids) are metabolized first during digestion, while more refractory molecules and inorganics remain in the digested WAS. With increasing digestion, the WAS attains an increasingly high percentage of ash (i.e., refractory or inorganic matter) at the expense of more valuable, nutritional components.

As discussed above, the process of the present invention bypasses WAS digestion in order to increase the protein and lipid content of the WAS and to enhance its nutritional value. Bypassing digestion increases the levels of crude protein in the recovered biosolids by minimizing degradation. For example, a dried filter-cake biosolids sample from a conventional wastewater treatment process including a digestion step had a protein content of approximately 33%, whereas a similar sample removed prior to digestion (and having a 'young' sludge age of approximately 5 days) yielded a protein content of more than 50%—a value approaching the 60% to 70% protein levels generally considered a practical upper limit for protein levels in bacteria, (Niedhardt et al, *Physiology of the Bacterial Cell: A Molecular Approach,* 1990 Sunderland, Mass.; Gottschalk, *Bacterial Metabolism,* $2^{nd}$ edition, 1986, Springer-Verlag; both of which are herein incorporated by reference in their entirety for all purposes).

In the process of the present invention, the amount of bacterial mass produced, and the protein levels in the bacterial mass are controlled by adjusting the mean cell retention time (MCRT) of the bacterial cells in the process. The MCRT value itself can be controlled by adjusting the rate at which bacterial mass is removed (also referred to as "wasted") from the process, as will be described in more detail below.

The MCRT can be calculated by dividing the instantaneous total cellular (e.g., bacterial) mass in the wastewater treatment process by the bacterial mass removed per unit time. The total bacterial mass in the process can be measured by various conventional methods, for example by removing wastewater samples of known volume from the process, measuring the bacterial mass in those samples, and extrapolating the bacterial mass in those samples to that of the total bacterial mass in the entire volume of the wastewater treatment process. Other methods of estimating the total bacterial mass will be evident to those of ordinary skill in the art. Thus, if the total bacterial mass is 100 pounds, and 20 pounds of bacterial mass are removed per day, the MCRT value would be 5 days.

In one embodiment, the MCRT of the process of the present invention should be adjusted to no more than about 8 days. In other embodiments the MCRT is maintained at no more than about 7 days, no more than about 6 days, no more than about 5 days, no more than about 4 days, or no more than about 3 days, or no more than about 2 days (inclusive of all ranges and subranges between any of the above stated values). Alternatively stated, no more than about ⅛, 1/7, ⅙, ⅕, ¼, ⅓, or ½ of the bacterial mass should be removed from the treatment process per day (inclusive of all ranges and subranges between any of these values). In still other embodiments, the MCRT is about 1 to 6 days, about 1 to 4 days, or about 1 to 3 days. If the MCRT is greater than about 6 days, lower yields of protein are obtained because the average age of the bacterial cells is too high, and relatively old bacterial cells are subjected to endogenous decay that results in a lowering of total protein content, and in some cases, lower quality protein. If the MCRT value is too low (e.g., lower than about 1 day), the bacterial cells suspended in the bulk liquid are unable to settle in a gravity settler, and therefore alternative separation methods such as dissolved air flotation and membrane bioreactors must be used to separate "young" cells from the bulk liquid. In general, cells that are 2.5 days or older settle well. If ammonia must be removed from the wastewater (e.g., as dictated by a wastewater treatment permit), then the cells cannot be significantly younger than about 4 days.

In addition, it has been found that controlling the "mean waste residence time" (MWRT) in conjunction with the MCRT provides improved protein levels from the harvested bacterial mass. The MWRT is the mean residence time of carbon-containing compounds in the process (e.g., the organic compounds contributing to the BOD of the waste stream), measured from the time at which these compounds enter the process (e.g., the aeration vessel) in the wastewater stream, and ending when the carbon is recovered in the dried bacterial mass (i.e., after the drying step is complete). The MWRT is calculated by dividing the total mass of carbon in the process (e.g., carbon entering the process in the wastewater plus the carbon content of the bacterial cells suspended in the wastewater—minus any carbon, e.g., $CO_2$, lost by various metabolic processes or carbon lost by precipitation, etc.) by the total mass of carbon in the dried bacterial mass recovered per day. The term "dried bacterial mass" refers to a bacterial mass dried to a moisture content at which the bacterial mass is sufficiently stable for storage and transport (e.g. less than about 30% moisture, less than about 20% moisture, less than about 10% moisture, less than about 5% moisture, less than about 4% moisture, less than about 3% moisture, less than about 2% moisture, or less than about 1% moisture). Thus, if the total mass of carbon in the process is 100 pounds, and 15 pounds per day of carbon are recovered after drying the bacterial mass, the MWRT is about 6.7 days. The MWRT correlates with the length of time between removing the bacterial mass from the process and subsequently drying the bacterial mass. Thus, MWRT values can be controlled by how quickly the bacterial mass is dried upon removal from the process—low MWRT values can be attained by drying the bacterial mass almost immediately upon separation and removal. Since MWRT is inherently limited by MCRT, MWRT values can also be controlled by adjusting the MCRT. For example, if separation and drying require one day and the MCRT is 4 days, then reducing MWRT by one day can be accomplished by reducing MCRT by one day (e.g., by increasing the wasting rate while continuing to dry the separated cells within one day).

In one embodiment, the MWRT value for the process of the present invention is more than about 10 days. In other embodiments, the MWRT value is no more than about 9 days, no more than about 8 days, no more than about 7 days, no more than about 6 days, no more than about 5 days, no more than about 4 days, no more than about 3 days, or no more than about 2 days (inclusive of all ranges and subranges between any of these values). In a particular embodiment, the MWRT value is 6.5-7 days or less. In other embodiments, the MWRT value is 2-5 days or less, or about 2-3 days. If the MWRT is $\geq$ about 7 days, the protein yield from the process is reduced because some degradation of the bacterial cells can occur prior to recovery and drying of the bacterial mass. In the process of the present invention, the MWRT and MCRT values can both be controlled such that the protein content within the bacterial mass is reduced no more than 50% during the time period between recovering and drying. In some embodiments, the relative MWRT and MCRT values can be mathematically expressed as "MWRT−MCRT", such that MWRT−MCRT is $\leq$ about 2 days. In other embodiments the value of MWRT−MCRT is $\leq$ about 1 day, $\leq$ about 0.5 days, $\leq$ about 0.25 days $\leq$ 0.2 days, $\leq$ 0.15 days, $\leq$ about 0.1 days, or $\leq$ 0.05 days, inclusive of all values and ranges there between. In still other embodiments, the value of MWRT−MCRT is about 0.05 to about 0.5 days, about 0.1 to about 0.5 days, about 0.25 to about 2 days, about 0.25 to about 1 day, about 0.25 to about 0.5 days, about 0.5 to about 2 days, or about 0.5 to about 1 day.

In other embodiments of the process of the present invention, the entire process is carried out under essentially aerobic conditions. The term "essentially aerobic conditions" includes embodiments of the process of the present invention employing an equalization tank (i.e., an influent holding tank or surge tank which allows the process of the present invention to operate under steady flow conditions regardless of the instantaneous volume of wastewater generated by the food processing plant). Although no treatment of the wastewater in the equalization tank is intended, under some conditions a small amount of anaerobic digestion can occur in the equalization tank; however the degree of anaerobic digestion under such conditions is substantially lower than that provided by unit operations known in the art which are designed to support anaerobic digestion processes. Anaerobic process steps, operating conditions, or unit operations have been found to reduce the quality of the biomass produced in the subsequent aerobic process (i.e., protein content, etc.) by converting the waste substrate (e.g., the food-derived growth medium) to reduced forms that do not support protein production in bacterial cells in quantities sufficient to produce an economic bacterial SCP. In addition, anaerobic process steps do not provide significant amounts of (anaerobic) bacterial protein. In other words, the resulting crude protein content appears to be limited to <60% when anaerobic pretreatment of the influent is employed. This relative lack of protein results in material which is only marginally profitable or unprofitable.

FIG. 3 schematically illustrates one embodiment of the process of the present invention. Wastewater from a food manufacturing process 20 and containing waterborne residuals 21 flows into a growth vessel 22. The growth vessel 22 can have any structure suitable for the growth and proliferation of microorganisms known in the wastewater treatment art, including one or more conventional anoxic vessels or one or more conventional aeration basins in which the residuals (i.e., waterborne, BOD-containing material) are contacted with suspended microorganisms (e.g., bacteria, commonly present at less than about 1% solids). Although not preferred, in some embodiments the growth vessel 22 can also include a conventional anaerobic vessel. During the biological wastewater treatment, these microorganisms metabolize the waterborne residuals present in the wastewater stream, and thereby proliferate while reducing the BOD levels in the wastewater.

The microorganisms can be separated from the treated wastewater by a variety of unit processes including, for example, gravity settling (as described in US 2003/0232107, herein incorporated by reference in its entirety for all purposes), dissolved air flotation, a membrane bioreactor, or other processes known in the art. In one embodiment, the microorganisms are separated by gravity settling (FIG. 3) wherein the mixed liquor suspended solids from the aeration basin(s) 22 flow into a clarifier 23. The microorganisms are allowed to settle to the bottom of the clarifier, while the overflow (i.e., treated water largely free of total suspended solids) is discharged from the top of the clarifier into a receiving water body 24. The underflow (containing the bulk of the microorganisms originally found in the mixed liquor suspended solids, generally dewatered to between approximately about 0.1% and about 3% solids) is split into two streams. The first of these streams is returned to the wastewater treatment process in order to maintain an adequate concentration of microorganisms in the process. This first stream is commonly referred to as return activated sludge (RAS). The second of these streams (commonly referred to as waste activated sludge or WAS) is optionally dewatered, then dried within a short time period to a sufficiently low moisture content to prevent further reduction in the protein content of the WAS. The dried bacterial mass can then be optionally further processed into a form (e.g., particles, granules, pellets, etc.) that is convenient for use as animal feed directly, or for formulation with other ingredients into animal food.

As indicated above, in most embodiments the wastewater treatment process (e.g., 22, FIG. 3) is carried out in a growth vessel. Removal of the microorganisms from the wastewater, for example using a clarifier process (e.g., 23, FIG. 3) can be carried out in separate clarifier vessel, or alternatively both processes can be carried out in the same vessel (e.g., a sequencing batch reactor) by changing operating conditions, for example, by periodically shutting down agitation in the growth vessel, thereby allowing gravity settling and removal of the microorganisms.

Other unit processes for separating and recovering the bacterial cells from the bulk liquid (for example as discussed above) can be used in place of a clarifier. For example, when the clarifier is replaced with a dissolved air flotation unit, the overflow of the dissolved air filtration unit would be split into the return activated sludge (which is returned to the growth vessel) and waste activated sludge streams, and the treated wastewater (i.e., treated water largely free of total suspended solids) would be discharged from the underflow. Another example includes the use of membrane bioreactors, or MBRs, that employ membrane filters to separate the bacterial cells from the bulk liquid, oftentimes within the growth vessel. A portion of these cells could then be returned to the growth vessel in part or in its entirety, or it could be wasted in part or in its entirety. Similarly, other unit processes that could be used for separating and recovering the bacterial cells from the bulk liquid would be integrated in the appropriate manner with the growth vessel to provide for growing and proliferating the bacterial mass using the waterborne residuals contained in the wastewater stream, then separating and drying the WAS. Regardless of the specific separation process used, the rate at which WAS is removed from the overall process, or the rate at which the dried bacterial mass is obtained, wasting and drying processes are both adjusted so as to provide MCRT, MWRT, and MWRT–MCRT values as described above. Accordingly, the BOD levels in the wastewater stream are reduced to sufficiently low levels so as to comply with permitted levels for discharge into receiving water bodies (e.g., lakes, rivers, oceans) while a dried bacterial mass with high protein levels suitable for use in animal feed is generated economically.

Prior to being added to the growth vessel, the wastewater and waterborne residuals therein used in the process of the present invention are maintained under hygienic conditions like those of the food-quality materials that comprise conventional food products, so that the ultimate dried cellular mass obtained from the process of the present invention is suitable for use in animal feeds for animals raised for human consumption. For example, in order to maintain the appropriate hygienic levels of the waste stream, an industrial food processor utilizing the process of the present invention would avoid disposing of heavy organics (i.e., degreasers and cleaners), toxic chemicals (including metals), or sewage into the same wastewater stream, and would treat the waste stream with at least the same level of care as other by-product streams destined for animal consumption. In one embodiment, the wastewater and waterborne residuals comply with the requirements outlined in the American Association of Feed Control Officials Official Publication (2007) (herein incorporated by reference in its entirety for all purposes).

Immediately after separation and removal from the process (e.g., from the clarifier, air flotation unit, or membrane bioreactor), but prior to drying, the solids content of the WAS is typically about 0.1% to about 3%. Although the WAS can be dried directly, it is often more efficient and less costly to dewater the WAS prior to drying. In one embodiment, a belt filter press can be used to provide efficient, partial dewatering of the WAS. Alternatively, a centrifuge or other means (such as a vacuum-assisted press, a filter press column, a screw press, a rotary press, a drum thickener, a gravity belt thickener, electrically mediated dewatering, extrusion dewatering, a plate and frame press, etc.) also can be used. The dewatering can also be facilitated by the addition of flocculating agents, e.g., GRAS (Generally Recognized as Safe) flocculating agents such as cationic polymers, nonionic polymers, anionic polymers, acrylamides, polyacrylamides, polyacrylates, acrylamide-acrylate copolymers, etc. Following dewatering with e.g. a belt press, the solids content of the WAS increases generally to between about 4% and about 40%. As a practical matter, it is difficult to remove all (i.e., 100%) of the water present in the bacterial mass, so terms such as "wet" and "dry" are relative terms. As discussed above, the term "dry" refers to a low enough level of water such that the bacterial mass is sufficiently stable for storage and transport. The term "sufficiently stable" means that less than about a 5% reduction in protein content is observed over a 30 day period when stored under normal conditions (e.g., a temperature of less than or equal to about 25° C., relative humidity below about 60%). The solids content of "dry" WAS ranges from about 80% to about 100%, for example about 80%, about 82%, about 85%, about 87%, about 90%, about 92%, about 95%, about 97%, about 99%, or about 100% inclusive of all values, ranges, and subranges therebetween.

In some embodiments, rather than recovering the biomass in the form of generally intact microbial cells, at least a portion of the microbial cells may be lysed by any conventional method, for example to improve protein digestibility.

Next, the dewatered WAS can be converted into a form suitable for an actual animal feed (e.g., a pellet). This unit process includes both the drying of the bacterial mass and the deactivation of the microorganisms present therein. For example, after belt pressing, the dewatered WAS can be subjected to an extrusion process. In the extrusion process, the dewatered WAS (containing approximately 15% solids) is pressurized and passed through orifices in order to produce multiple elongated strands, each with a uniform cross-section (which provides for even drying and distribution of heat). The strands are then dried further, typically by maintaining a temperature of 105° C. for a period of about one day or less. In other embodiments (independently of the conversion method used), the dewatered WAS can be dried within a temperature range of 55°-105° C., 65°-95° C., or about 80° C., for a time sufficient to reduce the moisture content to a range of about 10%. For example, the dewatered WAS can be dried for a time period of less than about a day at a temperature of about 70°-105° C., dried for a time period of less than about a day at a temperature of about 70°-95° C., or dried for a time period of less than about a day at a temperature of about 80° C. In particular embodiments, the dewatered WAS is dried at about 68° C.±10° C. In other particular embodiments, the dewatered WAS is dried at about 68° C.±10° C. until a solids content of at least about 95% is achieved.

In some embodiments, some portion of the biomass may be retained in the relatively "clean" water discharged (e.g., from the clarifier, air flotation unit, or membrane bioreactor) after isolating the WAS from the process, and may be recovered therefrom using suitable methods. Such additional recovery steps increase the overall efficiency and cost effectiveness of the process of the present invention by increasing the cellular yield from the process and by allowing treatment facilities to meet effluent requirements. The additional biomass recovered in this manner may be combined with WAS isolated from e.g., a clarifier, or may by separately dewatered, dried, and combined with dried biomass obtained elsewhere in the process.

Any suitable drying method can be used, provided that the dewatered WAS is heated at a sufficient time and temperature to dry the bacterial mass sufficiently without degrading the protein content therein. Drying methods include, for example single-pass and dual-pass ovens, spray dryers, rotary drum dryers, tray dryers, solar drying, etc.

As a result of the drying process, the microorganisms present in the dried material are "deactivated" or "inactivated". "Deactivation" of microorganisms is the process by which viable microorganisms are rendered non-viable with respect to further proliferation (e.g., by killing the microorganisms). It will be understood that it is generally not practical to deactivate 100% of all microorganisms present in a microbial cell mass. Therefore, an "inactivated" microbial cell mass is one in which the level of inactivation is sufficient to produce a safe food material for the animals intended to utilize this material as a food. After drying, the dried bacterial mass has a ratio of protein/ash of about 2.5/1 to 6.5/1 (or about 45% protein/17% ash to about 65% protein/10% ash). In other embodiments, the protein/ash ratio is about 3.2/1 to 8.1/1 (or about 55% protein/17% ash to about 65% protein/8% ash). In still other embodiments, the protein/ash ratio is about 10/1 to 12.5/1 or about 10/1 to about 12.5 to 1. In further embodiments, the ratio of protein to ash is about 2.7/1, about 2.9/1, about 3.0/1, about 3.4/1, about 3.6/1, about 3.8/1, about 4.0/1, about 4.2/1, about 4.4/1, about 4.6/1, about 4.8/1, about 5.0/1, about 5.2/1, about 5.4/1, about 5.6/1, about 5.8/1, about 6.0/1, about 6.2/1, about 6.4/1, about 6.6/1, about 6.8/1, about 7.0/1, about 7.2/1, about 7.4/1, about 7.6/1, about 7.8/1, about 8.0/1, about 8.2/1, about 8.4/1, about 8.6/1, about 8.8/1, about 9.0/1, about 9.2/1, about 9.4/1, about 9.6/1, about 9.8/1, about 10.0/1, about 10.2/1, about 10.4/1, about 10.6/1, about 10.8/1, about 11.0/1, about 11.2/1, about 11.4/1, about 11.6/1, about 11.8/1, about 12.0/1, about 12.2/1, about 12.4/1, or about 12.5/1, inclusive of all ratios of protein/ash, ranges of protein/ash, and subranges of protein/ash therebetween.

The dried and deactivated bacterial mass can then be further processed, if needed, into a form more suitable for feeding to animals. For example, dried strands (or alternatively dried sheets or granules) of the bacterial mass can be chopped, ground, or crushed to provide a desired pellet size corresponding to the animal for which the food is intended. For example, fish and cattle generally prefer pellets of approximately ¼-inch diameter while chickens generally prefer a coarse scratch material. A subsequent screening step to remove fines can also be included when such fines are considered problematic (e.g., in aquaculture, fines can undesirably compromise water quality). At this stage, the dried and processed bacterial mass is suitable for use directly as an animal feed, or can be combined with other ingredients in the formulation of animal feeds.

As discussed above, the bacterial biomass produced by any of the processes of the present invention is different from the biomass WAS produced from conventional wastewater treatment processes in various ways. For example, because the wastewater itself is maintained under hygienic conditions, the resulting biomass does not contain toxic or otherwise deleterious components (e.g., heavy metals, detergent residues, etc.) which would render it unsuitable or unfit for consumption by animals (e.g., fish) which would subsequently be used as food sources for humans.

Also, by controlling the process to provide MCRT, MWRT, and MWRT–MCRT values as described herein, the bacterial biomass produced by any of the processes of the present invention is of generally higher quality compared to the protein of biomass produced from wastewater streams by conventional processes. For example, the levels of free nucleic acids present in biomass reflect the degree of degradation of the cells—higher levels of free nucleic acids indicate higher levels of cellular degradation, and lower quality protein. The level of free nucleic acids in the biomass produced by the claimed process is generally about 10% or less (in some embodiments about 9% or less, about 8% or less, about 7% or less, about 6% or less, about 5% or less, about 4% or less, about 3% or less, about 2% or less, about 1% or less, inclusive of values and ranges therebetween). By contrast, conventional processes for the biological treatment of wastewater streams generally produce biomass with higher free nucleic acid levels, e.g., about 11-12% or higher. In addition, the crude protein content (i.e., protein levels estimated based on the analyzed nitrogen content) of the biomass provided by the process of the present invention is typically higher than about 56% (for example about 58%, about 60%, about 62%, about 64%, about 66%, about 68%, about 70%, about 72%, about 74%, about 76%, about 78%, about 80%, about 82%, or about 84%, inclusive of all values and ranges therebetween), whereas biomass produced from conventional wastewater treatment processes has a much lower crude protein content, generally about 30-56%. In one embodiment, the crude protein values of the biomass produced by the process of the present invention ranges from about 60-82%. In another embodiment, the crude protein content ranges from about 66-80%.

As indicated above, "crude protein" estimates the total protein content based on the analyzed nitrogen content of the biomass. However, crude protein values generally overestimate the actual amount of protein in the biomass, since the analyzed nitrogen content includes nitrogen from non-proteinaceous sources (nucleic acids, etc.). "True protein" content is an alternative measure of protein content based on the amount of amino acids present in the biomass. The processes of the present invention produce dried biomass having true protein contents higher than 50% (for example, about 51%, about 52%, about 53%, about 54%, about 55%, about 56%, about 57%, about 58%, about 59%, about 60%, or about 62%, inclusive of all values and ranges therebetween). In contrast, the biomass produced from conventional processes generally have true protein values of <40%.

The biomass produced by the process of the present invention also has relatively high levels of vitamin B-12, for example levels greater than about 5 mg/kg, greater than about 7 mg/kg, greater than about 10 mg/kg, or greater than about 12 mg/kg, inclusive of all values, ranges, and subranges therebetween.

Furthermore, and as described herein, the biomass produced by the various processes of the present invention is typically carried out using a mixture of different types of microorganisms, typically aerobic organisms (or facultative aerobes, microaerophiles, etc.), but can also include anaerobic microorganisms. Using a mixture of different types of microorganisms can be advantageous in that the population of microorganisms can adapt to changes in process conditions, whereas processes using a single type of microorganism (e.g., anaerobes) are more vulnerable to process "upsets" which could reduce the amount of biomass produced.

In addition, the process of the present invention differs from other known processes for producing animal feeds comprising microorganism-derived biomass (e.g., Norferm's currently abandoned process for producing the Bioprotein® product) in that the nutrient source of the process of the present invention is renewable and much less expensive—i.e., uses essentially "free" nutrients, which would typically be discarded, obtained from the wastewater streams of food and beverage processing plants—whereas e.g. Norferm's process uses relatively valuable "fossil" hydrocarbons (e.g., natural gas), which would typically be used as a fuel source, as the nutrient source for methanotrophic microorganisms. As a result, the process of the present invention is substantially less expensive and essentially "carbon-neutral"—i.e., utilizes a nutrient source comprising biologically derived carbon, rather than a nutrient source comprising "fossil" carbon (which would increase the net $CO_2$ levels in the environment).

The economic advantages of the process of the present invention result from the fact that wastewater treatment and disposal is generally considered to be part of the expense of operating a food or beverage processing plant. Since the process of the present invention produces biomass suitable for use as animal feed and "treated" wastewater having low BOD levels suitable for disposal in a receiving body of water, the process of the present invention effectively does not add additional wastewater treatment costs, while also producing a commercially valuable product (i.e. animal feed). Thus, the nutrient source (i.e. wastewater) for growing the bacterial cells is effectively "free". As a result, the process of the present invention can provide biomass suitable for use in animal feeds, as well as the resulting animal feed, at substantially lower cost than conventional methods.

Furthermore, since the nutrient source of the microorganisms used in the process of the present invention is renewable, the biomass produced from the process is chemically different and can be distinguished from the biomass derived from non-renewable (i.e., "fossil" hydrocarbon or petrochemical) sources. As discussed above, the renewable nutrients used in the various processes of the present invention are derived from the waste products of processing foods and/or beverages. These waste products are thus derived from plant or animal sources. Plants "fix" atmospheric $CO_2$ to product the carbohydrates (i.e., sugars, cellulose, etc.) needed by the plant to grow and reproduce, and animals eat these plants (or eat animals which eat plants). Thus, the carbon atoms of all animals and plants ultimately derive from atmospheric $CO_2$.

Atmospheric $CO_2$ comprises a small amount of the radioactive isotope $^{14}C$. This $^{14}C$ is produced continuously in the atmosphere when atmospheric nitrogen atoms are struck by neutrons produced in the atmosphere by cosmic rays, causing these nitrogen atoms to lose a proton and form $^{14}C$, which is then immediately oxidized to $^{14}CO_2$. A small but measurable fraction of atmospheric $CO_2$ is thus present in the form of $^{14}CO_2$. Plants which "fix" atmospheric $CO_2$, including $^{14}CO_2$, and the animals which consume these plants, thus incorporate $^{14}C$. $^{14}C$ decays slowly to $^{14}N$ (half-life of 5730 years), and thus "fossil" carbon sources (e.g., petroleum, natural gas) contain reduced levels of $^{14}C$ compared to renewable carbon sources derived from more recent biological activity. As a consequence, biomass produced from renewable nutrient sources (i.e., the biomass produced by the various processes of the present invention) has higher levels of $^{14}C$ compared to biomass produced from nutrients comprising "fossil" carbon.

The $^{14}C$ content of products can be quantified by various methods, for example by ASTM test method D 6866-05 ("Determining the Biobased Content of Natural Range Materials Using Radiocarbon and Isotope Ratio Mass Spectrometry Analysis", which is incorporated herein by reference in its entirety). This test method measures the $^{14}C/^{12}C$ isotope ratio in a sample and compares it to the $^{14}C/^{12}C$ isotope ratio in a standard 100% biobased material to give the percent biobased content of the sample. "Bio-based materials" are organic materials in which the carbon comes from recently (on a human time scale) fixated $CO_2$ present in the atmosphere. For example, a bio-based material typically has a $^{14}C/^{12}C$ isotope ratio of approximately the steady state environmental levels of about 1 ppt (part per trillion), or slightly lower (i.e., due to a small amount of radioactive decay). Contrarily, a fossil-based material, has a significantly lower $^{14}C/^{12}C$ isotope ratio compared to bio-based materials, because the initial $^{14}C$ levels are substantially reduced by radioactive decay. This ratio can also be reported as a percentage with the units "pMC" (percent modern carbon). If the material being analyzed is a mixture of present day radiocarbon and fossil carbon (containing very low levels of $^{14}C$), then the pMC value obtained correlates directly to the amount of biomass material present in the sample. The compositions of the present invention have pMC values of at least about 1, 5, 10, 15, 20, 25, 30, 35, 40, 45, 50, 55, 60, 65, 70, 75, 80, 85, 90, 95, 100, inclusive of all values and subranges therebetween. In one embodiment, the compositions of the present invention have a pMC value is about 100. In other embodiments, the compositions of the present invention have a pMC of at least about 90.

The dewatering, drying, and deactivation processes must occur within a short timeframe following removal of the bacterial mass from the wastewater treatment process (i.e., to provide MWRT values within the ranges described above). This short timeframe ensures that the resulting dried bacterial mass has sufficiently high protein content and quality suitable for use as animal feed, or animal feed additive. This generally requires that the dewatering, drying and deactivation processes must occur in the immediate proximity of the wastewater treatment process where the bacterial mass is produced.

The process of the present invention can be operated in a continuous manner. For example, the wastewater can be introduced into the growth vessel (e.g., aeration basin) continuously, and the WAS and the total suspended solids-free treated wastewater can be removed continuously. In addition, the WAS removed from the process can be optionally dewatered and then dried continuously as well. Alternatively, the process of the present invention can be operated in a batch mode, wherein the flow of wastewater can be interrupted, and the WAS removed from the process can be stored for a period of time or transported to another location, e.g. within the process tanks, or in a holding vessel, or via trucks, pipelines, etc., before drying. In other embodiments, the wastewater and treated wastewater largely free of total suspended solids can be introduced and removed, respectively, on a continuous basis, while a batch of the WAS removed in the process is stored briefly before being dried.

In a particular embodiment, the process of the present invention is operated in a continuous manner under consistent conditions year-round in order to maximize protein content and minimize variability, as variation in e.g. protein content of more than about ±5-10% can cause difficulties in formulating animal feeds from the compositions of the present invention.

Microorganisms suitable for use in the process of the present invention include genetically modified bacteria, *Pseudomonas*, Flavobacteria, Achromobacteria, Micrococci, Bacilli, Alcaligenes, methanogens, *Nitrosomonas*, Nitrobacteria, nitrifying bacteria (e.g., bacteria which convert $NH_3$ to $NO_3^-$), aerobic heterotrophs (e.g., obligate or facultative aerobes that use an organic substrate for growth and development), any of the microorganisms described in U.S. Pat. No. 4,317,843 (which is herein incorporated by reference in its entirety for all purposes) and combinations thereof.

The growth vessel can contain a single strain of bacteria (e.g., a single strain of any of the bacteria described herein), or two or more strains of bacteria (e.g., a combination of any of the bacteria described herein). In one embodiment, the bacteria or mixture of bacteria are selected to provide a dried bacterial mass having a crude protein content of about 45% or more. In other embodiments, the crude protein content of the dried bacterial mass is about 50% or more, about 55% or more, about 60% or more, about 65% or more, about 70% or more, or about 75% or more (inclusive of all values or subranges therebetween). In certain embodiments, the crude protein content of the dried bacterial mass can be less than about 45%, for example about 30-45%.

In other embodiments, the amino acid levels, total amino acid levels, and crude protein levels are at least those of the following table:

| Amino Acid | % of sample |
| --- | --- |
| Alanine | 4.65% |
| Arginine | 2.02% |
| Aspartic Acid | 5.43% |
| Glutamic Acid | 4.12% |
| Glycine | 3.46% |
| Histidine | 0.86% |
| Isoleucine | 2.26% |
| Leucine | 3.57% |
| Lysine | 2.57% |
| Methionine | 1.25% |
| Cystine | 0.31% |
| Phenylalanine | 2.07% |
| Proline | 2.19% |
| Serine | 1.45% |
| Threonine | 3.21% |
| Tryptophan | 0.74% |
| Tyrosine | 2.18% |
| Valine | 3.13% |
| Total | 45.47% |
| Crude Protein stated | 53.80% |

In still other embodiments, the amino acid levels and total amino acid levels are at least those of the following table:

| Amino Acids | % of Sample |
| --- | --- |
| Alanine | 3.82% |
| Arginine | 3.60% |
| Aspartic Acid | 6.36% |
| Glutamic Acid | 8.04% |
| Glycine | 2.81% |
| Histidine | 1.46% |
| Isoleucine | 3.38% |
| Leucine | 5.06% |
| Lysine | 4.34% |
| Methionine | 1.41% |
| Cysteine | 0.55% |
| Phenylalanine | 3.29% |
| Proline | 2.77% |
| Serine | 2.82% |
| Threonine | 3.11% |
| Tryptophan | 0.98% |
| Tyrosine | 2.83% |
| Valine | 3.52% |
| Total | 60.15% |

In a particular embodiment, genetically modified bacteria are employed. Suitable genetically modified bacteria include bacteria modified to express in excess of 65% protein, or higher levels of lysine (e.g., approximately 5.5% of the total material), methionine (e.g., approximately 2.3% of the total material), cysteine (e.g., approximately 0.6% of the total material), histidine (e.g., approximately 2% of the total material), and arginine (e.g., approximately 4.4% of the total material).

In the process of the present invention, bacteria can be added to the growth vessel either as a seed (i.e., prior to start-up of the waste treatment process) or as a supplement to the bacteria population already present. The conventional practice for wastewater treatment plant start-up involves transporting solids from an existing treatment plant. These solids may have been in contact with municipal sewage. However, in the process of the present invention it is desirable to avoid contacting microorganisms destined for animal feed with municipal sewage. However, microorganisms derived from (i.e., the "offspring" of) bacterial populations present in sewage plants can be used, provided that the process itself is not contaminated by components of the sewage which would render the ultimate biomass produced unsuitable for use in animal feeds. Accordingly, in one embodiment of the process of the present invention, any of the various bacteria appearing on the list of food additives approved for direct feeding to humans compiled by the United States Food and Drug Administration (Association of American Feed Control Officials, 2001 Official Publication, herein incorporated by reference in its entirety for all purposes) can be used to produce a suitable bacterial culture containing one or more types of bacteria. For example, one or more strains of the "approved" bacteria indicated above are loaded into a fermentor (e.g. a chemostat, a sequencing batch reactor, etc.). The final concentration of bacteria in the mixed liquor suspended solids of the fermentor should fall between approximately 1000 mg/L and 10,000 mg/L, or another concentration (e.g., about 1500 mg/L, about 2000 mg/L, about 2500 mg/L, about 3000 mg/L, about 3500 mg/L, about 4000 mg/L, about 4500 mg/L, about 5000 mg/L, about 5500 mg/L, about 6000 mg/L, about 6500 mg/L, about 7000 mg/L, about 7500 mg/L, about 8000 mg/L, about 8500 mg/L, about 9000 mg/L, or about 9500 mg/L, inclusive of all values, ranges, and subranges there between) that provides ready settling of the bacterial flocs or otherwise facilitates recovery of the bacterial mass (e.g., by air flotation, using a membrane bioreactor, etc.). The fermentor can be of conventional designs that include means for mixing the culture of microorganisms, introducing substrate-containing water, maintaining appropriate redox conditions, and decanting water following the settling of bacterial flocs. The substrate-containing influent to the fermentor is actual process-water, containing waterborne BOD-contributing residuals from a food processing operation. The decanted water from the fermentor is mostly depleted of this BOD, having provided energy and substrate to meet the growth and maintenance needs of the bacterial culture. During the growth of the bacterial culture, parameters such as total suspended solids, volatile suspended solids, fixed suspended solids, and sludge volume index are determined as a means of monitoring growth and settling properties of the bacterial culture. At various stages in the development of the bacterial culture, bacterial growth requires moving the bacteria from a fermentor of a given size to an incrementally larger apparatus to accommodate the increasing number of microorganisms. This task must always provide for maintaining an appropriate sludge volume index in the mixed liquor suspended solids of a fully charged reactor, generally between about 100 L/kg and about 300 L/kg. The ultimate goal of this culturing procedure is to create a controlled community of innocuous microorganisms that constitute the activated sludge component of an industrial-scale process-water treatment plant. The waste activated sludge from this plant, in either liquid or filter-cake form can be utilized to inoculate future treatment plants using this community of microorganisms. Alternatively, specific bacteria or enzymes could be introduced into the process on a continuous basis in a manner that enhances the production of protein and other nutritional components.

The bacterial culture in the process of the present invention can comprise mixtures of different bacterial strains, or can comprise a bacterial monoculture. For example, the bacterial culture in the process of the present invention can be a monoculture derived from pharmaceutical production processes (using fermentative processes). As a result of the tight controls employed in the production of pharmaceutical products, the filter-cake provided by such operations comprises homogeneous bacterial populations (generally monocultures) of single-cell organisms. Such well characterized bacterial cultures can be used in the process of the present invention to produce microbial food products consisting of a controlled community (or even a single species) of microorganism(s) rather than spontaneous or amended populations of mixed bacteria.

After treatment by the microorganisms in the growth vessel, the treated wastewater removed from the process (e.g., the overflow stream from a clarifier) has lower levels of waterborne residuals (i.e., dissolved and/or suspended waste products). The BOD level of the treated wastewater can be $\leq$ about 600 mg/L, and in other embodiments $\leq$ about 500 mg/L, $\leq$ about 400 mg/L, $\leq$ about 300 mg/L, $\leq$ about 200 mg/L, $\leq$ about 100 mg/L, $\leq$ about 50 mg/L, or $\leq$ about 30 mg/L.

In order to maximize the proliferation of bacteria in the process of the present invention, nutrients can be added to the wastewater in the growth vessel. Suitable nutrients include, for example, macronutrients, micronutrients, vitamins, amino acids, and combinations thereof. These nutrients should be added in sufficient amounts to provide for balanced growth of the bacterial culture as described above.

A non-limiting list of suitable macronutrients include any biologically assimilable source of C, H, O, N, and P, for example sugars, phosphates, and ammonia.

A non-limiting list of suitable micronutrients includes biologically acceptable sources of K, Mg, Ca, Na, Fe, S, B, Zn, I, Cu, Co, Mo, Mn, Se, Ni, Al, Ag, Cr, F, Si, Sn, V, Ba, and combinations thereof. It will be understood that "biologically acceptable" refers to a source of the indicated element, in the appropriate form suitable for absorption and utilization by microorganisms. In some cases, the "suitable" form will be elemental, but in other cases, the micronutrient will be in the form of a salt or a compound containing the element. Thus, for example, a biologically acceptable source of K and Na includes salts of $K^+$ and $Na^+$ such as KCl, $K^+$ acetate, NaCl, $Na^+$ acetate, etc.; biologically acceptable sources of Mg and Ca include salts of $Mg^{2+}$ and $Ca^{2+}$ such as $MgSO_4$, $CaSO_4$, etc.; biologically acceptable sources of Fe include salts of $Fe^{3+}$ such as $Fe_2(SO_4)_3$; biologically acceptable sources of S and Se include S or Se containing amino acids such as cysteine and selenocysteine; biologically acceptable sources of Zn include $Zn^{2+}$ salts such as $Zn^{2+}$ acetate, $Zn^{2+}$ sulfate, and $Zn^{2+}$ gluconate; biologically acceptable sources of I include $I^-$ salts such as NaI; biologically acceptable sources of Cu include $Cu^{2+}$ salts such as $CuSO_4$; biologically acceptable sources of Ni include $Ni^{2+}$ salts such as $NiCl_2$ and its hydrates; biologically acceptable sources of Co include vitamin $B_{12}$; biologically acceptable sources of Mo include molybdate salts such as $Na_2MoO_4$; biologically acceptable sources of Mn include MnO, $Mn_2O$, or $MnSO_4$; biologically acceptable sources of F include $F^-$ salts such as NaF and $SnF_2$; biologically acceptable sources of V include $V^{2+}$ salts such as $VSO_4$; biologically acceptable sources of B include $B^{3+}$ salts including boric acid; and biologically acceptable sources of Ba include $Ba^{2+}$ salts such as $BaCO_3$.

A non-limiting list of suitable vitamins includes vitamin A, vitamin $B_1$, vitamin $B_2$, vitamin $B_3$, vitamin $B_5$, vitamin $B_6$, vitamin $B_7$, vitamin $B_9$, vitamin $B_{12}$, vitamin C, vitamin D, vitamin E, and vitamin K.

Other nutrients include, for example, purines, pyrimidines, and porphyrin-containing metalloproteins (including hemes).

A non-limiting list of suitable amino acids includes alanine, arginine, asparagine, aspartic acid, cysteine, glutamic acid, glutamine, glycine, histidine, isoleucine, leucine, lysine, methionine, phenylalanine, proline, serine, threonine, tryptophan, tyrosine, and valine.

Ultimately, the dried bacterial mass provided by the process of the present invention is fed to animals by conventional methods (e.g., spreaders, troughs, etc.). The term "feeding" or "fed" to animals means the oral ingestion and subsequent internal metabolism of a food material by animals. The animal food comprising the dried bacterial mass produced by the process of the present invention meets the daily metabolic needs of the animals, including growth and maintenance, thereby providing animals suitable for human or animal consumption. Food comprising the dried bacterial mass provided by the process of the present invention can be fed to various animals, including mammals, birds, and fish. In one embodiment, the fish include those of the biological class Osteichthyes, such as but not limited to any of the following: tilapia, milkfish, bass, sturgeon, catfish, salmon, tuna, perch, bluegill, bream, walleye, trout, cobia, and carp. In another embodiment, the mammals include sheep, cattle, horses, swine, mink and other furbearing animals, and goats. In yet another embodiment, the birds include poultry such as turkeys, chickens, ducks, and geese.

If the dried bacterial mass is deficient in specific nutrients (e.g., vitamins, minerals, carbohydrates, lipids, or fiber), they may be added to the dried bacterial mass during the formulation of the animal food or, as an alternative, separately supplied to the animals without being mixed into the biosolids. Similarly, in order to customize the composition of the ultimate food product to the target animal, other 'bulking' materials (e.g., wheat middlings, potato shavings, etc.) can be added to the biosolids to improve the structural properties or digestibility of the animal food. Other additives such as colorants or flavoring agents (e.g., dyes, fish oil, or herbal extracts) can also be added to the animal food comprising dried bacterial mass produced in the process of the present invention as a means of improving the commercial quality of the meat obtained from the animals. In addition, the biosolids produced by the process of the present invention can also be mixed with other animal feeds to produce the ultimate animal feed. In other words, the biosolids produced by the process of the present invention can be amended with other components in much the same manner as, for example, fish meal is used today. Animal feed formulations comprising the dried bacterial mass produced by the process of the present invention can be formulated using conventional methods, for example using Brill Formulation Software, to provide well-characterized formulated animal feeds.

The present invention is also directed to a wastewater treatment unit for treating wastewater from a food and/or beverage processing plant. The wastewater treatment plant of the present invention comprises a growth vessel; means for adding an aqueous waste stream comprising metabolizable components to the growth vessel; at least one bacterial culture in the growth vessel, which metabolizes at least a portion of the metabolizable components of the aqueous waste stream, thereby forming a bacterial suspension in an aqueous bulk liquid, wherein the aqueous bulk liquid is depleted of metabolizable components relative to the aqueous waste stream; means for aerating the bacterial suspension and aqueous bulk liquid in the growth vessel; means for separating a portion of the bacterial suspension from the aqueous bulk liquid, thereby forming a bacterial mass; means for removing the bacterial mass from the wastewater treatment unit; means for adjusting the rate at which the bacterial mass is removed to provide a MCRT of the bacteria in the wastewater treatment unit of no more than about 8 days; means for removing a portion of the aqueous bulk liquid from the wastewater treatment unit, wherein said aqueous bulk liquid is substantially free of total suspended solids; means for drying the removed bacterial mass; and means for adjusting the time period in which the removed bacterial mass is dried whereby MWRT−MCRT≦ about 2 days.

As described above, the growth vessel can include e.g. a membrane bioreactor, fermentation vessel, or one or more aeration tanks.

The means for adding an aqueous waste stream can include e.g. pumps, pipes, etc. connecting the food and/or beverage processing plant waste stream to the growth vessel.

Figure 4:
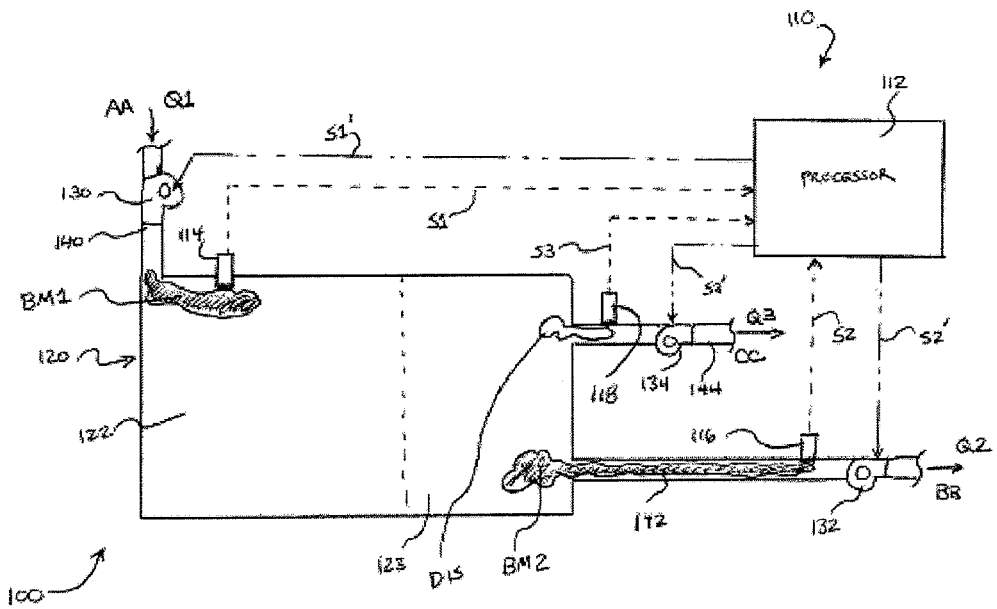
FIG. 4 is a schematic illustration of a waste water treatment according to an embodiment.

FIG. 4 is a schematic illustration of a waste water treatment system 100 according to an embodiment. The waste water treatment system 100 includes a vessel 120, a first (e.g., variable-speed) pump 130, a second (e.g., variable-speed) pump 132, a third (e.g., variable-speed) pump 134 and a controller 110. The vessel 120, which can be any vessel of the types shown and described herein, includes a growth portion 122 and a clarifying portion 123. The growth portion 122 is configured to contain bacteria and/or promote bacterial growth as described herein. The clarifying portion 123 is configured to promote separation of a bacterial mass from an aqueous bulk liquid, as described herein. Although the growth portion 122 and the clarifying portion 123 are shown schematically as being included in a single structure (i.e., the vessel 120), in other embodiments, the growth portion 122 and the clarifying portion 123 can be included in separate and/or distinct structures. Similarly stated, in other embodiments, the waste water treatment system 100 can include any number of vessels in which any of the various operations described herein can take place. Moreover, although the growth portion 122 and the clarifying portion 123 are shown schematically as being spatially distinct portions of the vessel 120, in other embodiments, the growth portion 122 and the clarifying portion 123 can occupy the same region of the vessel 120. In some embodiments, for example, the vessel 120 can be a sequencing batch reactor.

As described above, an aqueous waste stream can be conveyed into the vessel 120 via the first flow passageway 140, as shown by the arrow AA in FIG. 4. The aqueous waste stream can be any waste stream of the types shown and described herein. For example, in some embodiments, the aqueous waste stream can be generated by a food processing plant, and can include a metabolizable component, such as, for example, spent grains. The first pump 130 is disposed within the first flow passageway 140 and can control the flow rate Q1 of the aqueous waste stream into the vessel 120. Similarly stated, the first pump 130 can adjust the flow rate Q1 of the aqueous waste stream into the vessel 120.

After the aqueous waste stream enters the vessel 120, at least a portion of the metabolizable components within the aqueous waste stream are metabolized to form a bacterial mass suspended within an aqueous bulk liquid within the vessel 120. A first portion of the suspended bacterial mass is identified as BM1 in FIG. 4. As described herein, the bacterial mass can be separated from the aqueous bulk liquid in the clarifying portion 123 of the vessel 120. Similarly stated, within the clarifying portion 123 of the vessel 120 the aqueous bulk liquid can be separated into a discharge portion DIS that is substantially free of suspended solids and a second portion of the bacterial mass BM2 that contains the bacterial mass produced within the vessel 120.

The second portion of bacterial mass BM2 of the aqueous bulk liquid can be conveyed out of the vessel 120 via a second flow passageway 142, as shown by the arrow BB in FIG. 4. As described herein, after the second portion of bacterial mass BM2 exits the vessel 120, the second portion of bacterial mass BM2 can be further processed into a form convenient for use as animal feed. Such additional processing can include, for example, dewatering, drying or the like. The second pump 132 is disposed within the second flow passageway 142 and can control the flow rate Q2 of the second portion of bacterial mass BM2 of the aqueous bulk liquid within the second flow passageway 142. As described in more detail herein, the second pump 132 can adjust the flow rate Q2 of the second portion of bacterial mass BM2 out of the vessel 120.

The discharge portion DIS of the aqueous bulk liquid can be conveyed out of the vessel 120 via a third flow passageway 144, as shown by the arrow CC in FIG. 4. As described herein, the discharge portion DIS can be conveyed into a receiving body of water. The third pump 134 is disposed within the third flow passageway 144 and can control the flow rate Q3 of the discharge portion DIS of the aqueous bulk liquid within the third flow passageway 144. As described in more detail herein, the third pump 134 can adjust the flow rate Q3 of the discharge portion DIS out of the vessel 120.

The controller 110 is configured to automatically adjust the flow rate Q1 of the aqueous waste stream into the vessel 120, the flow rate Q2 of the bacterial mass portion BM2 of the aqueous bulk liquid out of the vessel 120 and/or the flow rate Q3 of the discharge portion DIS of the aqueous bulk liquid out of the vessel 120. In this manner, the controller 110 can maintain the properties of the second portion of bacterial mass BM2 and/or the discharge portion DIS. For example, in some embodiments, the controller 110 can adjust the flow rate Q2 of the second portion of bacterial mass BM2 of the aqueous bulk liquid out of the vessel 120 such that the MCRT of the bacterial mass within the waste water treatment system 100 is within a predetermined range. The predetermined range of the MCRT can be any of the ranges disclosed herein, such as, for example a range between approximately 2 days and approximately 8 days.

The controller 110 includes a processor 112 that is operatively coupled to a first sensor 114, a second sensor 116 and a third sensor 118. The processor 112 is also operatively coupled to the first pump 130, the second pump 132 and the third pump 134. The first sensor 114 is configured to produce a signal S1 associated with a quantity of the first portion BM1 of the bacterial mass within the waste water treatment system 100. The first sensor 114 can be any suitable sensor for measuring the quantity of the first portion BM1 of the bacterial mass within a sampled portion of the aqueous bulk liquid in the waste water treatment system 100. For example, in some embodiments, the first sensor 114 can measure the concentration of the first portion of the bacterial mass BM1 within the sampled portion of the aqueous bulk liquid. In some embodiments, the first sensor 114 can produce the first signal S1 as a function of, for example, the conductivity of the sampled portion of the aqueous bulk liquid, the acidity of the sampled portion of the aqueous bulk liquid and/or the optical properties (e.g., light transmission properties) of the sampled portion of the aqueous bulk liquid. Other methods of obtaining a signal based on the quantity of the first portion BM1 of the bacterial mass (e.g., gravimetric, etc.) can also be used.

The processor 112 is configured to receive the signal S1 and calculate a total cell mass of the bacterial mass within the waste water treatment system 100. As described above, in some embodiments, the processor 112 can be configured to calculate a total cell mass by extrapolating based on the quantity of the first portion BM1 of the bacterial mass. In other embodiments, the processor 112 can maintain a temporal log of the quantity of the first portion BM1 of the bacterial mass such that calculation of the total cell mass accounts for temporal fluctuations in the contents of the aqueous waste stream entering the vessel 120.

Although the first sensor 114 is shown as being included within the vessel 120, in other embodiments, the first sensor 114 can be disposed in any suitable location within the waste water treatment system 100. For example, in some embodiments, first sensor 114 can be disposed within the first passageway 140 and can thus measure the concentration of the bacterial mass within the aqueous waste stream entering the vessel 120. In such embodiments, the first sensor 114 can also produce a signal associated with the flow rate Q1 of the aqueous waste stream entering the vessel 120. In this manner, the first sensor 114 can produce the signal S1 associated with the bacterial mass entering the vessel 120.

Although the controller 110 is shown as including a single first sensor 114, in other embodiments, the controller 110 can include any number of sensors configured to produce signals associated with a quantity of various portions of the bacterial mass within the waste water treatment system 100. Similarly stated, in some embodiments, the controller 110 can include multiple sensors, each configured to produce a signal associated with a quantity of bacterial mass within a particular location of the waste water treatment system 100. In this manner, the processor 112 can calculate the total cell mass of the bacterial mass within the waste water treatment system 100 based on received input from various sensors. Thus, in such embodiments, the calculation of the total cell mass can account for spatial variability in the contents of the waste water treatment system 100.

The second sensor 116 is configured to produce a signal S2 associated with a quantity of the second portion BM2 of the bacterial mass exiting the waste water treatment system 100. Similarly stated, the second sensor 116 is configured to produce a signal S2 associated with a quantity of the second portion BM2 of the bacterial mass as the second portion BM2 flows within the second passageway 142. The second sensor 116 can be any suitable sensor for measuring the quantity of the second portion BM2 of the bacterial mass within a sampled portion of the aqueous bulk liquid in the waste water treatment system 100, such as the sensor types described above with reference to the first sensor 114. For example, in some embodiments, second sensor 116 can produce a signal associated with the flow rate Q2 of the aqueous bulk liquid exiting the vessel 120.

The processor 112 is configured to receive the signal S2 and calculate the mean cell retention time (MCRT) of the bacterial mass within the waste water treatment system 100. As described above, the MCRT can be calculated as a function of the total cell mass of the bacterial mass within the waste water treatment system 100 and the quantity of the second portion BM2 of the bacterial mass exiting the waste water treatment system 100. In some embodiments, the processor 112 can calculate the MCRT for a predetermined period of time (e.g., for a period of one hour). In this manner, the processor 112 can track the temporal fluctuation in the MCRT. In other embodiments, the processor 112 can calculate the MCRT substantially in real time.

In some embodiments, the processor 112 is configured to receive the signal S2 and calculate the mean waste residence time (MWRT) of the bacterial mass within the waste water treatment system 100. As described above, the MWRT can be calculated as a function of the MCRT and the time period within which the additional processing of the second portion BM2 of the bacterial mass is completed. Such additional processing can include, for example, dewatering, drying or the like.

The third sensor 118 is configured to produce a signal S3 associated with a quantity of the bacterial mass exiting the waste water treatment system 100 within the discharge portion DIS of the aqueous bulk liquid. Similarly stated, the third sensor 118 is configured to produce a signal S3 associated with a BOD of the discharge portion DIS of the aqueous bulk liquid. The third sensor 118 can be any suitable sensor for measuring the quantity of the bacterial mass within a sampled portion of the aqueous bulk liquid in the waste water treatment system 100, such as the sensor types described above with reference to the first sensor 114.

The processor 112 is configured to produce a first control signal S1' received by the first valve 130, a second control signal S2' received by the second valve 132 and a third control signal S3' received by the third valve 134. In this manner, the controller 110 can maintain the properties of the second portion of bacterial mass BM2 and/or the discharge portion DIS by controlling the flow of the aqueous waste stream into the vessel 120, by controlling the flow of the second portion BM2 of the bacterial mass out of the vessel 120 and/or by controlling the flow of the discharge portion DIS of the aqueous bulk liquid out of the vessel 120. In some embodiments, for example, the processor 112 can automatically adjust (i.e., adjust without substantial human intervention) the flow rate of the aqueous waste stream into the vessel 120. In some embodiments, for example, when the MCRT of the bacterial mass within the waste water treatment system 100 begins to decrease, the first control signal S1' can be adjusted such that the first pump 130 allows a higher flow rate of the aqueous waste stream into the vessel 120, thereby increasing the total cell mass of the bacterial mass within the waste water treatment system 100. In other embodiments, the first control signal S1' can be adjusted to reduce the flow rate of the aqueous waste stream into the vessel 120 when the MCRT of the bacterial mass within the waste water treatment system 100 begins to increase. In this manner, the MCRT and/or the MWRT of the bacterial mass can be automatically maintained within a predetermined range.

In some embodiments, the processor 112 can automatically adjust (i.e., adjust without substantial human intervention) the flow rate of the second portion BM2 of the bacterial mass out of the vessel 120. In some embodiments, for example, when the MCRT of the bacterial mass within the waste water treatment system 100 begins to decrease, the second control signal S2' can be adjusted such that the second pump 132 reduces the flow rate of the second portion BM2 of the bacterial mass out of the vessel 120, thereby increasing the MCRT. In other embodiments, the second control signal S2' can be adjusted to allow an increased flow rate of the second portion BM2 of the bacterial mass out of the vessel 120 when the MCRT of the bacterial mass begins to increase beyond a predetermined control point.

In some embodiments, the processor 112 can automatically adjust (i.e., adjust without substantial human intervention) the flow rate of the discharge portion DIS of the aqueous bulk liquid out of the vessel 120. In some embodiments, for example, when the BOD of the discharge portion DIS is above a predetermined threshold, the third control signal S3' can be adjusted such that the third pump 134 reduces the flow rate of the discharge portion DIS of the aqueous bulk liquid out of the vessel 120. In this manner, the controller 110 can maintain the BOD of the discharge portion DIS within predetermined limits.

The processor 5950 can include a memory device (not shown) configured to receive and store information, such as a series of instructions, processor-readable code, a digitized signal, or the like. The memory device can include one or more types of memory. For example, the memory device can include a read only memory (ROM) component and a random access memory (RAM) component. The memory device can also include other types of memory suitable for storing data in a form retrievable by the processor 5950, for example, electronically-programmable read only memory (EPROM), erasable electronically-programmable read only memory (EEPROM), or flash memory.

The pumps 130, 132, 134 can be any suitable pump for producing and/or controlling the flow rates Q1, Q2 and Q3 shown above. For example, in some embodiments, any of the pumps 130, 132, 134 can be a variable speed, positive displacement pump (e.g., a gear pump, a vane pump, a piston pump or the like). In other embodiments, any of the pumps 130, 132, 134 can be a non-positive displacement pump (e.g., an impeller pump) configured to operate at either a constant speed or at variable speeds. In yet other devices, the waste water system 100 need not include pumps, but can rather include any suitable device configured produce and/or control the flow rates Q1, Q2 and/or Q3 shown above. For example, in some embodiments, the waste water treatment system 100 can include one or more valves configured to control the flow rates Q1, Q2 and/or Q3 shown above.

Although the waste water treatment 100 is shown and described as including a pump 134 configured to produce and/or control flow rate Q3 of the discharge portion DIS of the aqueous bulk liquid out of the vessel 120, in other embodiments, the flow rate Q3 of the discharge portion DIS can be produced and/or controlled by gravity. In such embodiments, for example, the third flow passageway 144 can be devoid of any pump and/or valve. In such embodiments, the flow rate Q3 of the discharge portion DIS can be controlled indirectly by controlling the flow rate Q1 and/or the flow rate Q2, as described herein.

Although second flow passageway 142 is shown as being configured to convey substantially all of the second portion of bacterial mass BM2 out of vessel 120, in other embodiments, a portion of the second portion of bacterial mass BM2 can be returned to the vessel 120 by a return passageway (not shown in FIG. 4). In this manner, a desired concentration of biologically active organisms can be maintained in the vessel 120. In such embodiments, the return passageway can include a sensor and a pump similar to the sensors and pumps described above.

The processor 112 can be any processing device configured to receive, store and process information, as described herein, such as a series of instructions, processor-readable code, a digitized signal, or the like. In some embodiments, the processor 112 can be a commercially-available processing device (or set of devices) configured to receive the signals and perform the calculations described herein. The processor 112 can include programmable control settings to adjust the control signals S1', S2' and/or S3' as a function of the error between a target setting and an actual value. Such control settings can include, for example, proportional, integral and/or derivative gain settings. In this manner, for example, the processor 112 can adjust the control signals S1', S2' and/or S3' in a manner that maintains control of the MCRT of the bacterial mass without causing significant temporal fluctuations in the MCRT.

In some embodiments, the processor 112 can include a memory device (not shown) configured to receive and store information. The memory device can include one or more types of memory. For example, the memory device can include a read only memory (ROM) component and a random access memory (RAM) component. The memory device can also include other types of memory suitable for storing data in a form retrievable by the processor 112, for example, electronically-programmable read only memory (EPROM), erasable electronically-programmable read only memory (EEPROM), or flash memory.

Although the sensors 114, 116 and 118 are shown and described above as being disposed within a portion of the vessel 120 and/or the flow passageways, in other embodiments, a sensor can be disposed in any location suitable for monitoring the waste treatment process. For example, in some embodiments, the waste water treatment system 100 can include one or more sensors disposed apart from the aqueous bulk liquid. For example, in some embodiments, the waste water treatment system 100 can include a sensor configured to produce a signal associated with a characteristic of the second portion of bacterial mass BM2 as it undergoes the additional processing (e.g., the dewatering, drying or the like). In some embodiments, a sensor can be configured to produce a signal associated with a water content of the second portion of the bacterial mass BM2 after it undergoes a drying process. In other embodiments, a sensor can be configured to produce a signal associated with a protein content of the second portion of the bacterial mass BM2. Such a sensor can be, for example, a sensor configured to analyze various constituents (e.g., Nitrogen) of an exhaust gas produced by combusting a sample of the second portion of the bacterial mass. In this manner, the controller 110 can receive any suitable signal and can adjust the flow rates Q1, Q2 and/or Q3 and/or any other process parameter based on the received signal such that the biological mass (e.g., BM2) produced by the waste water treatment system 100 has desired properties (e.g., water content, protein level or the like). Thus, the waste water treatment system 100 can reduce variability that can be associated with external factors, such as, for example, change of seasons, change in content of incoming waste stream, degradation of organisms within vessel 120, change in performance of components of water treatment system, or the like.

Moreover, although the sensors 114, 116 and 118 are shown schematically as being integrated devices configured to measure a property and output a signal in response to the measurement, in some embodiments, a sensor can include multiple different devices that cooperatively produce a signal associated with a characteristic of the bacterial mass. For example, a sensor can include a sample volume, a dryer and a scale configured measure a resulting mass. The signal can be associated with the measurement produced by the scale. Moreover, the signal can be conveyed to the processor 112 in any suitable fashion, such as, for example, electronically (via a wireless or wired connection), manually (e.g., via input from a keyboard), or the like.

Figure 5:
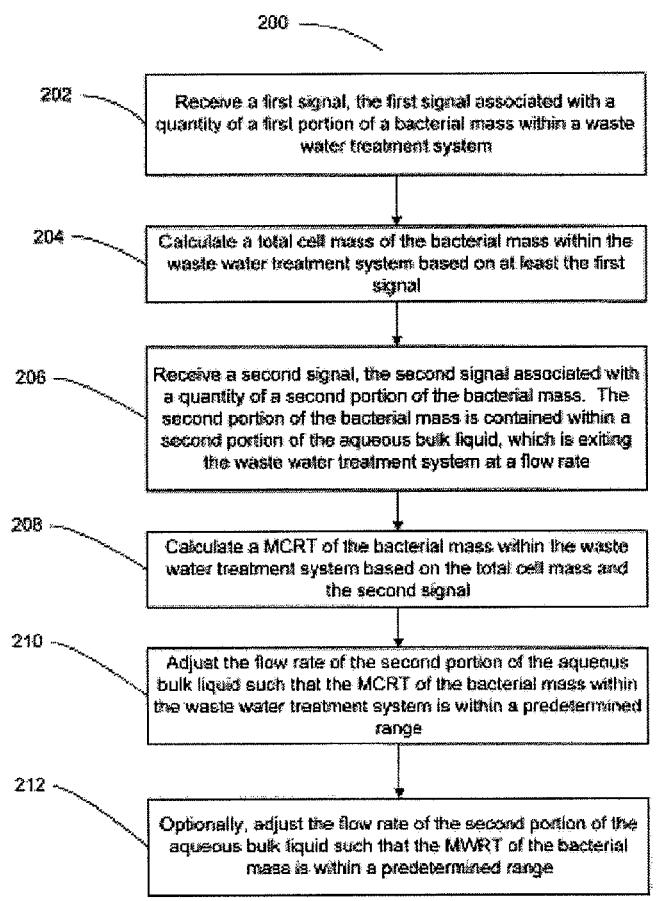
FIG. 5 is a flow chart of a method of adjusting a flow rate of an aqueous bulk liquid within a waste water treatment system according to an embodiment.

FIG. 5 is a flow chart of a method 200 of adjusting a flow rate of a liquid within a waste water treatment system according to an embodiment. The waste water treatment system can be any of the systems shown and described herein, such as, for example, the waste water treatment system 100 shown and described with reference to FIG. 4. The method includes receiving a first signal that is associated with a quantity of a first portion of a bacterial mass within a waste water treatment system, at 202. The first portion of the bacterial mass, which can be, for example, the first portion BM1 shown in FIG. 4, is contained within a first portion of an aqueous bulk liquid within the waste water treatment system. The first signal can be any signal of the types shown and described above, and can include for example, information associated with a flow rate of an aqueous waste stream into the waste water treatment system.

A total cell mass of the bacterial mass within the waste water treatment system is calculated based on at least the first signal, at 204. As described above, the total cell mass can be extrapolated from the information contained within the first signal. In other embodiments, the total cell mass can be calculated based on the information contained within the first signal over a predetermined time period.

A second signal associated with a quantity of a second portion of the bacterial mass is received, at 206. The second portion of the bacterial mass, which can be, for example, the second portion BM2 shown in FIG. 4, is contained within a second portion of the aqueous bulk liquid exiting the waste water treatment system at a flow rate. The method then includes calculating an MCRT of the bacterial mass within the waste water treatment system based on the total cell mass of the bacterial mass and the second signal, at 208.

The flow rate of the second portion of the aqueous bulk liquid is adjusted such that the MCRT of the bacterial mass within the waste water treatment system is within a predetermined range, at 210. In some embodiments, the flow rate of the second portion of the aqueous bulk liquid exiting the system can be adjusted automatically via a controller, such as, for example, the controller 110 shown and described above. In some embodiments, for example, the flow rate of the second portion of the aqueous bulk liquid exiting the system can be controlled substantially in real time to maintain the MCRT within the predetermined range (e.g., between approximately two days and approximately eight days). In some embodiments, the method can optionally include adjusting the flow rate of the second portion of the aqueous bulk liquid such that the MWRT of the bacterial mass within the waste water treatment system is within a predetermined range, at 212.

The one or more bacterial cultures in the growth vessel can include any of those described herein, and combinations thereof.

The means for aerating the bacterial suspension and aqueous bulk liquid in the growth vessel can include air diffusers or membrane diffusers in the shape of the disc, tube, or plate which is used to transfer air into the wastewater. Diffusers can use either rubber membranes or ceramic elements typically and produce either fine or coarse bubbles. These are referred to as fine bubble diffusers or coarse bubble diffusers. They are typically connected to a piping system which is supplied with pressurized air by a blower. Other examples of means for aerating include mechanical aerators (low or high speed mixers, submersible and surface aerators), jet aerators (Venturi), and paddle aerators.

Means for separating the bacterial suspension from the aqueous bulk liquid can include any of those disclosed herein.

Means for removing the bacterial mass from the wastewater treatment unit include pumps and the associated piping or open channels or weirs connected to the separator unit.

The means for adjusting the rate at which the bacterial mass is removed includes flow controllers which control variable-speed pumps (or alternatively, the opening and closing of valves) attached to the separator unit, thereby adjusting the flow rate at which the WAS is removed from the separator unit. The flow controller can be a computerized controller connected to the valves controlling the rate of introduction of the wastewater, the valves controlling the rate of removal of WAS, and valves controlling the rate of removal of the total suspended solids-free treated wastewater. The computerized controller can monitor the relative flow rates and solids concentrations and thereby adjust the rate at which WAS is removed relative to the rate at which wastewater is introduced in order to provide an MCRT value as described herein.

The means for removing a portion of the aqueous bulk liquid from the wastewater treatment unit including pumps and the associated piping, open channels, weirs, etc. connected to the separation unit.

The means for drying the removed bacterial mass includes any of the types of ovens described herein, or solar drying.

The means for adjusting the time period at which the removed bacterial mass is dried include controllers which adjust the rate at which the bacterial mass is produced into a drying unit (e.g., oven). If the bacterial mass (e.g., WAS) is dewatered prior to drying, the means for dewatering include any of those described herein, including a belt filter press, a centrifuge, a vacuum assisted press, a plate filter press, a screw press, a rotary press, a drum thickener, a gravity belt thickener, and electrically mediated the watering unit, and extrusion the watering unit, and a plate and frame press.

The means for adding nutrients to the growth vessel include storage tanks, flow monitoring equipment, dosing pumps, and the associated piping, open channels, weirs, etc. connected to the influent stream and/or the wastewater treatment vessels.

As discussed above, wastewater from food processing plants can be treated using the process of the present invention to provide an effluent wastewater stream with BOD levels in compliance with permitted levels, allowing for discharge into receiving water bodies or to a sewer connected to a treatment facility permitted to discharge to a receiving water body. In addition, relatively high amounts of biosolids (compared to conventional wastewater treatment processes) are recovered, which have a protein content and quality suitable for use as an ingredient in animal feeds, e.g. for aquaculture. Thus, the cost of treating the wastewater and disposing of the resulting biosolids can be offset by the economic value of the ingredient.

Accordingly, the wastewater treatment process of the present invention can be used as part of a business method comprising: identifying a food processing company that generates an aqueous waste stream comprising dissolved or suspended metabolizable food and/or beverage by-products with BOD levels of ≧ about 100 mg/L (for example BOD levels ranging from about 200,000 mg/L to about 200 mg/L, for example about 100,000 mg/L, about 50,000 mg/L, about 30,000 mg/L, about 20,000 mg/L, about 10,000 mg/L, about 1,000 mg/L, about 800 mg/L, about 400 mg/L, or about 200 mg/L), wherein the food processing company incurs treatment costs to reduce the BOD levels of the aqueous waste stream to within permitted levels; decreasing the treatment costs to the food processing company for reducing the BOD of the aqueous waste stream by a process comprising: adding an aqueous waste stream comprising metabolizable components to a growth vessel containing at least one bacterial culture, at a first flow rate; allowing the bacteria of the at least one bacterial culture to grow in the growth vessel by metabolizing at least a portion of the metabolizable components of the aqueous waste stream, thereby forming a bacterial suspension in an aqueous bulk liquid, wherein the aqueous bulk liquid is depleted of metabolizable components relative to the aqueous waste stream; separating a portion of the bacterial suspension from the aqueous bulk liquid, thereby forming a bacterial mass; removing the bacterial mass at a second flow rate; removing a portion of the aqueous bulk liquid at a third flow rate, wherein the aqueous bulk liquid is substantially free of total suspended solids and has a BOD within permitted levels; adjusting the second flow rate to provide a MCRT of the bacteria of no more than about 8 days; and drying the removed bacterial mass within a time period whereby MWRT−MCRT≦about 2 days; selling the dried bacterial mass as a protein source.

In one embodiment, a revenue stream can be generated by contracting with the food processing company to set up and operate a wastewater treatment process according to the present invention at a reduced cost to the food processing company (relative to the waste treatment and disposal costs of a conventional wastewater treatment process). That is, the food processing company pays the operator of the wastewater treatment process processing fees which are lower than the operating cost of a conventional wastewater treatment process. In this manner, the food processing company reduces wastewater treatment costs, and the operator of the wastewater treatment process of the present invention obtains two revenue streams—treatment fees and profits from selling the high protein content biosolids as in animal feed or animal feed supplement. Alternatively, in another embodiment, the food processing company would provide the wastewater free of charge to the operator of the wastewater treatment plant, who would then derive a revenue stream from sale of the biosolids produced in the treatment process. In some embodiments the "food processing company" and "operator" can be the same entity—i.e., the food processing company can operate the process of the present invention.

In other embodiments, the wastewater stream or usage rights thereto could be purchased at a cost such that the value of biosolids derived from the process exceed the purchase cost plus operating costs of the wastewater treatment process, etc.

Figure 6:
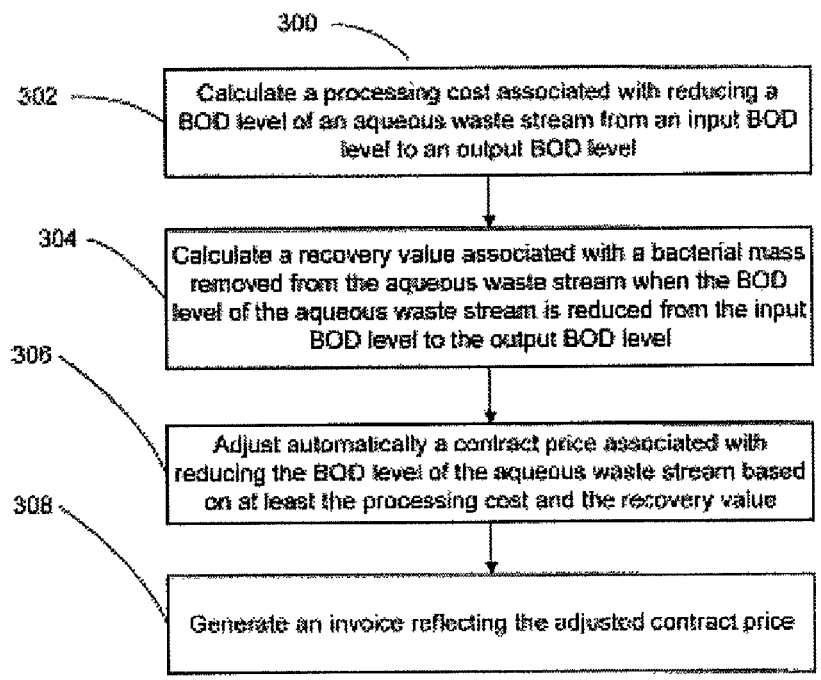
FIG. 6 is a flow chart of a method of adjusting a contract price associated with a waste water treatment process according to an embodiment.

FIG. 6 is a flow chart of a method 300 of adjusting a contract price associated with a waste water treatment process according to an embodiment. The illustrated method includes calculating a processing cost associated with reducing a BOD level of an aqueous waste stream from an input BOD level to an output BOD level, at 302. For example, as described herein, the processing cost can include the cost associated with reducing the BOD level of an aqueous waste stream from a food-processing plant (e.g., a brewery) from a value greater than 100 mg/L to a value below 100 mg/L. The processing cost can be calculated based on any factor that contributes to the cost of treating the incoming waste water stream. Such factors can include, for example, a volume cost associated with a flow rate of waste water treated, an energy cost associated with pumping and/or transferring materials in the water treatment system, a residence time cost associated with the length of time that portions of the waste water stream reside within the water treatment system, an energy cost associated additional processing (e.g., dewatering, drying or the like) of a bacterial mass produced during the treatment, an overhead cost associated with the operation of the system, and/or a capital cost associated with capital projects for the system. In some embodiments, for example, the processing cost can be calculated based on the MCRT of the bacterial mass within the treatment system. For example, in some embodiments, the processing cost can increase proportionally to the MCRT. In other embodiments, the processing cost can be calculated based on the MWRT of the bacterial mass, thereby including factors such as the drying time into the processing cost. For example, in some embodiments, the processing cost can increase proportionally to the MWRT.

The processing cost can be calculated in any suitable manner. For example, in some embodiments, the processing cost can be calculated substantially in real time. For example, in some embodiments, the processing cost can be calculated based on receiving one or more signals from a sensor measuring the treatment operation, such as, for example, the sensors 114, 116 and 118 shown and described above. In this manner, the processing cost can be calculated automatically as a function of time and/or for a predetermined time period. Thus, in some embodiments, the processing cost can be calculated as an average of multiple processing costs, each associated with a predetermined time period. For example, in some embodiments, the method can include calculating a daily, weekly and/or monthly processing cost.

In some embodiments, the processing cost can be calculated by a system configured to control and/or monitor the waste water treatment process. For example, in some embodiments, the processing cost can be calculated by a controller similar to the controller 110 shown and described above. In this manner, the calculation of the processing cost and the controlling of the waste water treatment process can be performed by a common system (e.g., the controller 110). Thus, in some embodiments, as described below, the common system can adjust a portion of the waste water treatment process based on at least the calculated processing cost. For example, in some embodiments, the controller (e.g., controller 110) can calculate the processing cost and adjust a portion of the waste water treatment process to maintain the processing cost within a predetermined limit.

A recovery value associated with a bacterial mass removed from the aqueous waste stream when the BOD level of an aqueous waste stream is reduced from the input BOD level to the output BOD level is calculated, at 304. For example, as described herein, the recovery value that can be any value realized in connection with the bacterial mass resulting from the treatment of the aqueous waste stream, such as, for example, the sale of the bacterial mass for animal feed. The recovery value can be calculated based on any factor such as a protein content of the bacterial mass (e.g., the crude protein content or the true protein content), the ash content of the bacterial mass, the cost of shipping the bacterial mass and/or market conditions. Market conditions can include, for example, the daily market price for certain animals and/or livestock, the market price for animal feed components (e.g., corn, soybean, etc.) or the like.

In some embodiments, the recovery value can be calculated substantially in real time. For example, in some embodiments, the recovery value can be calculated based on receiving one or more signals from a sensor measuring the treatment operation, such as, for example, the sensors 114, 116 and 118 shown and described above. In this manner, the recovery value can be calculated automatically as a function of time and/or for a predetermined time period. Thus, in some embodiments, the recovery value can be calculated as an average of multiple recovery values, each associated with a predetermined time period. For example, in some embodiments, the method can include calculating a daily, weekly and/or monthly recovery value.

In some embodiments, calculating the recovery value can include receiving a signal associated with a protein content of the bacterial mass. The signal can be produced by a sensor configured to measure and/or estimate the protein content of a bacterial mass. In some embodiments, for example, the recovery cost per unit weight of the bacterial mass increases proportionally to the protein content of the bacterial mass. In other embodiments, the recovery value can be calculated based on the MCRT and/or the MWRT, which, as described above, can be an indicator of the protein content of the bacterial mass.

In some embodiments, the recovery value can be calculated by a system configured to control and/or monitor the waste water treatment process. For example, in some embodiments, the recovery value can be calculated by a controller similar to the controller 110 shown and described above. In this manner, the calculation of the recovery value and the controlling of the waste water treatment process can be performed by a common system (e.g., the controller 110). Thus, in some embodiments, as described below, the common system can adjust a portion of the waste water treatment process based on at least the calculated recovery value. For example, in some embodiments, the controller (e.g., controller 110) can calculate the recovery value and adjust a portion of the waste water treatment process to maintain the recovery value within a predetermined limit.

The illustrated method includes adjusting automatically a contract price associated with reducing the BOD level of the aqueous waste stream based on at least the processing cost and the recovery value, at 306. The contract price is the price that the producer of the aqueous waste stream pays to have the BOD level of an aqueous waste stream reduced from the input BOD level to the output BOD level. In some embodiments, the contract price can be proportional to a difference between the recovery value and the processing cost. As described above, in some embodiments, the contract price can be calculated and/or updated as a function of time and/or for a predetermined time period. Thus, in some embodiments, the contract price can be calculated as an average of multiple contract prices, each associated with a predetermined time period. For example, in some embodiments, the method can include calculating a daily, weekly and/or monthly contract price. In this manner, the contract price can be automatically adjusted periodically based on changing conditions.

In some embodiments, the contract price can be adjusted by a system configured to control and/or monitor the waste water treatment process. For example, in some embodiments, the contract price can be adjusted by a controller similar to the controller 110 shown and described above. In this manner, the adjustment of the contract price and the controlling of the waste water treatment process can be performed by a common system (e.g., the controller 110). Thus, in some embodiments, as described below, the common system can adjust a portion of the waste water treatment process based on at least the contract price. For example, in some embodiments, the controller (e.g., controller 110) can adjust and/or calculate the contract price and adjust a portion of the waste water treatment process to maintain the contract price within a predetermined limit.

In some embodiments, the method optionally includes generating an invoice reflecting the adjusted contract price, at 308. The invoice can be either a hard-copy invoice (e.g., that is mailed to the producer of the waste stream) or a paperless invoice (e.g., that is transmitted electronically to the producer of the waste stream).

Figure 7:
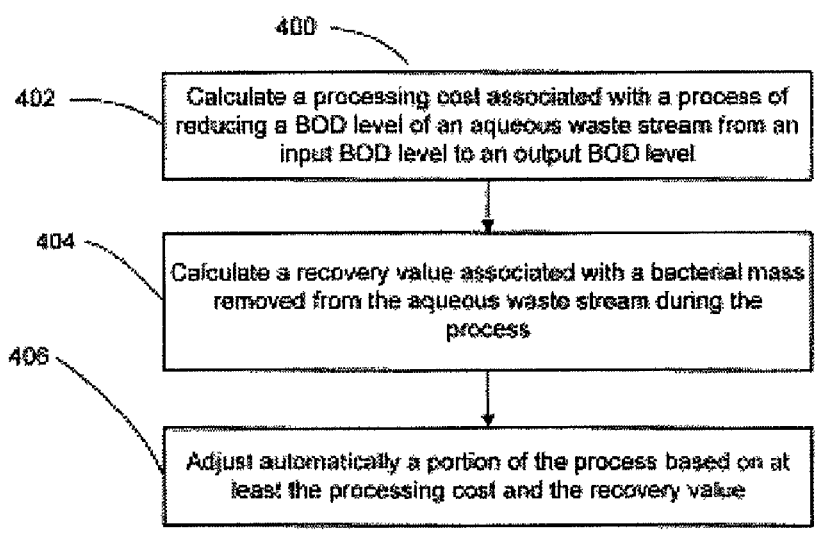
FIG. 7 is a flow chart of a method of adjusting a portion of a waste water treatment process according to an embodiment.

Although the method 300 shown and described above is associated with adjusting a contract price based on changing conditions, in other embodiments a method can include adjusting the waste treatment process based on a processing cost and/or a recovery value. In this manner, the waste treatment process can be adjusted to ensure that the waste stream is treated in a cost-effective manner. Said another way, in this manner, the characteristics (e.g., protein level, water content or the like) of the bacterial mass resulting from the waste water treatment process can be changed based on a processing cost and/or a recovery value. For example, FIG. 7 is a flow chart of a method 400 of adjusting a waste water treatment process according to an embodiment. The method 400 is described with reference to FIG. 8, which illustrates a graphical representation 450 of an embodiment having processing cost and a recovery value that vary as a function of certain parameters of the waste treatment process. In particular, the vertical axis, labeled as "cost/value," corresponds to the cost and/or value associated with a portion of a the waste treatment process. The horizontal axis, labeled as "time," corresponds to the time period associated with a portion of the waste treatment process. The time period can be, for example, the MCRT and/or the MWRT. Although the horizontal axis corresponds to a time period associated with a portion of the waste treatment process, in other embodiments, the horizontal axis can correspond to any parameter, the variance of which can result in a change in the cost and/or value associated with a portion of the waste treatment process.

A solid line represents a recovery value curve 452, which is the recovery value for the bacterial mass removed during the waste water treatment process as a function of the MWRT. A first dashed line represents a first processing cost curve 454, which is the cost of processing the waste stream as a function of the MWRT. A second dashed line represents a second processing cost curve 456, which is the cost of processing the waste stream as a function of the MWRT.

Figure 8:
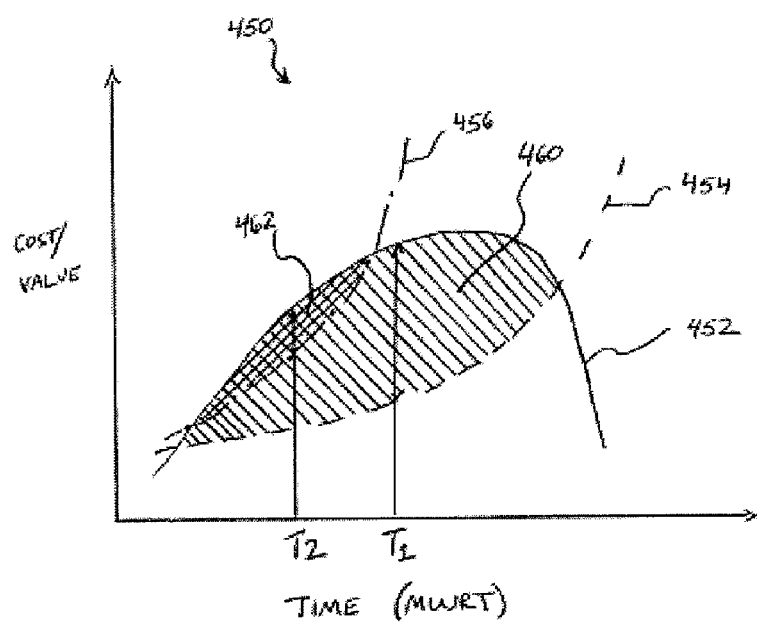
FIG. 8 is a graphical representation of a cost of treating an aqueous waste stream and a value of the recovered products as a function of time according to an embodiment.

Referring to FIG. 7, the illustrated method includes calculating a processing cost associated with a process of reducing a BOD level of an aqueous waste stream from an input BOD level to an output BOD level, at 402. The processing cost can be calculated in any suitable manner and by any suitable device, such as those described above with reference to the method 300. Moreover, as shown in FIG. 8, the processing cost can be calculated as a function of the MWRT. As shown, the processing cost curves 454, 456 increase with increasing MWRT. Such an increase can be attributed to many factors, including, but not limited to, the energy cost associated with drying the bacterial mass resulting from the waste treatment process. In other embodiments, the processing cost can be calculated as a function of the MCRT and/or any other parameter associated with the waste treatment process.

Referring to FIG. 7, the illustrated method includes calculating recovery value associated with a bacterial mass removed during the waste treatment process, at 404. The recovery value can be calculated in any suitable manner and by any suitable device, such as those described above with reference to the method 300. Moreover, as shown in FIG. 8, the recovery can be calculated as a function of the MWRT. As shown, the recovery value curve 452 initially increases with increasing MWRT, but then decreases beyond a threshold value of the MWRT. In some embodiments, the variance of the recovery value curve 452 can be attributed to the change in the protein content of the recovered bacterial mass as a function of MWRT. In other embodiments, the recovery value can be calculated as a function of the MCRT and/or any other parameter associated with the waste treatment process.

Referring to FIG. 8, the cross-hatched region 460 between the recovery value curve 452 and the first processing cost curve 454 graphically shows the range of MWRT within which the recovery value is greater than the processing cost. Similarly stated, the cross-hatched region 460 between the recovery value curve 452 and the first processing cost curve 454 graphically shows the range of MWRT within which the waste treatment process is profitable. Moreover, the cross-hatched region 460 includes a target value T1 of the MWRT at which the difference between the recovery value and the processing cost is maximized. Similarly stated, the target value T1 of the MWRT is the MWRT at which the profitability of the waste treatment process is maximized. In some embodiments, the target value T1 can be, for example, 6.5 days.

Under certain conditions, the processing cost and/or the recovery value as a function of the MWRT can change. Such change can be due to changing energy costs, changing material transportation costs or the like. Thus, under certain conditions, the value of the MWRT at which the maximum profitability of the waste treatment process occurs can change. In the example illustrated in FIG. 8, the variability in the processing cost is represented by the second processing cost curve 456, which reflects a higher processing cost than the first processing cost curve 454. The cross-hatched region 462 between the recovery value curve 452 and the second processing cost curve 456 graphically shows the range of MWRT within which the recovery value is greater than the processing cost. Moreover, the cross-hatched region 462 includes a target value T2 of the MWRT at which the difference between the recovery value and the processing cost is maximized. Similarly stated, the target value T2 of the MWRT is the MWRT at which the profitability of the waste treatment process is maximized. Referring to FIG. 7, the method includes adjusting automatically a portion of the process based on at least the processing cost and the recovery value, at 406. In this manner, the portion of the process (e.g., the target MWRT) can be adjusted automatically to maximize the profitability of the waste treatment process.

In some embodiments, the MWRT can be adjusted by a controller such as, for example, the controller 110 shown and described above. In some embodiments, for example, the controller can calculate and updated target MWRT and can transmit a pump control signal to a valve disposed within the waste treatment system to change a flow rate within the waste treatment system, as described above with reference to the method 200. Although FIG. 8 shows only the processing cost curve as changing, in other embodiments, the recovery value curve can change due to changing conditions. In yet other embodiments, both the processing cost curve and the recovery value curve can change.

While various embodiments of the invention have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

For example, although the method 200 is shown and described as including calculating a total cell mass before the second signal is received, in other embodiments, the total cell mass can be calculated after the second signal is received. In yet other embodiments, the total cell mass can be calculated as a function of the second signal.

EXAMPLES

Example 1

Potato-processing and brewery byproducts were evaluated as models for food processing wastewater streams to produce biosolids. During a scientifically rigorous feeding trial, bacteria containing 40% protein were added to ground feed formulations at 0% (control Diet #1), 21.5% (Diet 2), and 43% (Diet #3) on a mass basis and extruded into pellets. (As a result, the bacterial cells contributed 0%, 8.4% and 16.8% of the total protein in final feeds.) Tilapia fingerlings (300 *Oreochromis niloticus* fry) were then grouped into "blocks" that consisted of small, medium, and large fish and were fed one of the three feeds. The growth results show that the fish receiving the bacterial protein grew at a faster rate than those receiving conventional ingredients alone (FIG. 9). At the completion of the experiment, the fish were euthanized and whole-body analyses were performed for Kjeldahl nitrogen (as a protein measurement), ash, and total fat. The averages of these analytical results and the 95% confidence intervals are shown in Table 1 and FIG. 10 and show that fish receiving 43% bacterial cell derived protein (aka single cell protein, or SCP) possessed the highest average amount of Kjeldahl-N and were statistically identical to the control fish. Fish receiving 21.5% SCP had a slightly lower Kjeldahl-N concentration. Fish fed the 43% SCP diet also contained the highest amount of ash while the fish receiving the 21.5% diet had the lowest ash content and all diets resulted in fish with identical fat contents. These promising results show that utilizing the world's massive quantities of food-processing byproducts can result in significant benefits to aquaculture operations.

TABLE 1

Whole body analyses of Tilapia fed a control diet, 21.5% SCP, or 43% SCP.

| Sample name | Kjeldahl -N (g/kg) | ±Kjeldahl-N 95% CI | Ash (g/kg) | ±Ash 95% CI | Total Fat (g/kg) | ±Fat 95% CI |
|---|---|---|---|---|---|---|
| Control diet (all samples) | 25.9 | 0.86 | 33.9 | 2.2 | 68.2 | 14.77 |
| 21.5% diet (all samples) | 25.4 | 0.73 | 29.3 | 1.7 | 81.9 | 12.79 |
| 43% diet (all samples) | 26.8 | 0.6 | 38.8 | 2.3 | 66.2 | 4.04 |

Example 2

A wastewater stream having a BOD level of 5000 mg/L (no anaerobic pretreatment) was introduced at a rate of 3 gallons per minute into an 8800 gallon continuously stirred tank reactor (CSTR) containing a mixed community of unidentified bacteria obtained from the aerobic basin of a wastewater treatment serving a brewery. Activated sludge was not returned to the aerobic basin so the hydraulic residence time (HRT) of approximately 2 days equaled the MCRT. The microorganisms were fed excess nitrogen and phosphorus in the form of urea and phosphoric acid, respectively, as well as an aqueous mixture of micronutrient metals as described herein. The micronutrients consisted of soluble aluminum compounds at a concentration of <1% by weight of the final mixture, boric acid at a concentration of <1% by weight of the final mixture, citric acid at a concentration of <1% by weight of the final mixture, cobalt sulfate at a concentration of 1-5% by weight of the final mixture, copper sulfate at a concentration of 1-5% by weight of the final mixture, ferric chloride at a concentration of 1-5% by weight of the final mixture, manganese sulfate at a concentration of 1-5% by weight of the final mixture, nickel chloride at a concentration of 1-5% by weight of the final mixture, sodium molybdate at a concentration of 1-5% by weight of the final mixture, yeast extract at a concentration of <1% by weight of the final mixture, and zinc sulfate at a concentration of 1-5% by weight of the final mixture. This micronutrient mixture was added at a dosage equivalent to 1 µL per 250 mL of wastewater delivered to the aerobic tank. Process operating conditions therefore provided an MWRT value of approximately 2.5 days, and MWRT−MCRT of approximately 0.5 days. Biomass was removed from the CSTR and dewatered in a high-speed continuous centrifuge at 6000 gravities to a solids content of approximately 6%. The dewatered biomass was then dried at 68° C. for about 12 hours and bagged to prevent re-adsorption of moisture. The single cell protein prepared by the above process had the following properties:

| Composition | % |
| --- | --- |
| Crude protein | 64.7 |
| Crude fat | 5.0 |
| Mineral material | 15.0 |
| Crude fiber | 5.5 |

| Minerals | |
| --- | --- |
| Calcium | 9.1 g/kg |
| Iron | 1.5 g/kg |
| Potassium | 1.3 g/kg |
| Magnesium | 1.9 g/kg |
| Sodium | 14.4 g/kg |
| Phosphorus | 11.1 g/kg |
| Zinc | 180.0 mg/kg |
| Copper | 109.0 mg/kg |

| Vitamins | |
| --- | --- |
| Niacin | 83.3 mg/kg |
| Thiamine B1 | 7.7 mg/kg |
| Riboflavin | 39.0 mg/kg |
| Vitamin B12 | 12.0 mg/kg |
| Vitamin E | 29.8 IU/kg |

| Amino acids | % of sample |
| --- | --- |
| Alanine | 3.82% |
| Arginine | 3.60% |
| Aspartic acid | 6.36% |
| Glutamic acid | 8.04% |
| Glycine | 2.81% |
| Histidine | 1.46% |
| Isoleucine | 3.38% |
| Leucine | 5.06% |
| Lysine | 4.34% |
| Methionine | 1.41% |
| Cysteine | 0.55% |
| Phenylalanine | 3.29% |
| Proline | 2.77% |
| Serine | 2.82% |
| Threonine | 3.11% |
| Tryptophan | 0.98% |
| Tyrosine | 2.83% |
| Valine | 3.52% |
| Total | 60.15% |

We claim:

1. A process comprising:
    adding an aqueous waste stream comprising metabolizable components to a growth vessel containing at least one bacterial culture, at a first flow rate;
    allowing the bacteria of the at least one bacterial culture to grow in the growth vessel by metabolizing at least a portion of the metabolizable components of the aqueous waste stream, thereby forming a bacterial suspension in an aqueous bulk liquid, wherein the aqueous bulk liquid is depleted of metabolizable components relative to the aqueous waste stream;
    separating a portion of the bacterial suspension from the aqueous bulk liquid, thereby forming a bacterial mass;
    removing the bacterial mass at a second flow rate;
    removing a portion of the aqueous bulk liquid at a third flow rate, wherein the aqueous bulk liquid is substantially free of total suspended solids;
    adjusting the second flow rate to provide a MCRT of the bacteria of no more than about 8 days; and
    drying the removed bacterial mass within a time period whereby MWRT−MCRT≦about 2 days.

2. The process of claim 1, wherein MCRT is no more than about 6 days.

3. The process of claim 1, wherein MCRT is no more than about 6 days, and MWRT−MCRT≦1 day.

4. The process of claim 1, wherein said separating is carried out by gravity separating, dissolved air flotation, or by a membrane bioreactor.

5. The process of claim 1, wherein the aqueous waste stream added to the growth vessel comprises dissolved and/or suspended metabolizable food or beverage byproducts from a food processing plant producing human or animal food.

6. The process of claim 1, wherein said drying is carried out for a time period of about one day or less at a temperature of about 65°-95° C.

7. The process of claim 3, wherein said drying is carried out at a temperature of about 80° C. for a time period of one day or less.

8. The process of claim 1, wherein said drying is carried out within a time period whereby MWRT−MCRT≦1 day.

9. The process of claim 1, wherein the at least one bacterial culture comprises bacteria selected from the group consisting of genetically modified bacteria, Micrococci, Bacilli, Flavobacteria, methanogens, Pseudomona, Nitrosomona, Nitrobacteri, nitrifying bacteria, aerobic heterotrophs, and combinations thereof.

10. The process of claim 1, further comprising dewatering the removed bacterial mass prior to said drying.

11. The process of claim 1, wherein nutrients selected from the group consisting of macronutrients, micronutrients, vitamins, amino acids, and combinations thereof are added to the bacterial growth vessel.

12. The process of claim 11, wherein the macronutrients are biologically assimilable sources of C, H, O, N, and P.

13. The process of claim 11, wherein the vitamins are selected from the group consisting of vitamin A, vitamin $B_1$, vitamin $B_2$, vitamin $B_3$, vitamin $B_5$, vitamin $B_6$, vitamin $B_7$, vitamin $B_9$, vitamin $B_{12}$, vitamin C, vitamin D, vitamin E, and vitamin K.

14. The process of claim 1, wherein the aqueous bulk liquid has a BOD ranging from about 200 to about 200,000 mg/L.

15. The process of claim 1, wherein the dried bacterial mass has a ratio of protein/ash of about 6.0/1 to 8.0/1.

16. The process of claim 1, wherein the dried bacterial mass is suitable for use as a feed for animals used for human consumption and complies with the requirements of the American Association of Feed Control Officials Official Publication (2007).

17. The process of claim 1, wherein said process is a continuous process.

18. The process of claim 1, wherein said process is a batch process.

19. The process of claim 1, wherein the MCRT is about 1 to 6 days.

20. The process of claim 1, further comprising:
receiving a first signal, the first signal associated with a quantity of a first portion of the bacterial suspension, the first portion of the bacterial suspension contained within a first portion of an aqueous bulk liquid;
calculating a total cell mass of the bacterial suspension based on at least the first signal;
the quantity of bacterial mass removed at the second flow rate;
calculating the MCRT of the bacteria based on the total cell mass of the bacterial suspension and the second signal; and
adjusting the second flow rate such that the MCRT of the bacteria is within a predetermined range.

21. The process of claim 20, wherein the first signal is associated with a concentration of the first portion of the bacterial suspension within the first portion of the aqueous bulk liquid.

22. The process of claim 20, wherein:
the first portion of the aqueous bulk liquid is within a waste stream entering the growth vessel; and
the first signal is associated with a flow rate of the waste stream entering growth vessel.

23. The process of claim 20, wherein the second signal is associated with at least one of a concentration of the bacterial mass removed and the second flow rate.

24. The process of claim 20, wherein the predetermined range is between approximately two days and approximately eight days.

25. The process of claim 20, wherein the adjusting includes:
calculating a pump control signal based on the calculated MCRT of the bacteria and a target MCRT within the predetermined range; and
transmitting a pump control signal to a variable-speed pump disposed within a flow path of the bacterial mass being removed at a second flow rate.

26. The process of claim 20, further comprising:
adjusting the second flow rate such that the MWRT of the bacterial mass is within a predetermined range.

27. A method, comprising:
calculating a processing cost associated with reducing a biochemical oxygen demand level of an aqueous waste stream from an input biochemical oxygen demand level to an output biochemical oxygen demand level;
calculating a recovery value associated with a bacterial mass removed from the aqueous waste stream when the biochemical oxygen demand level of the aqueous waste stream is reduced from the input biochemical oxygen demand level to the output biochemical oxygen demand level; and
adjusting automatically a contract price associated with reducing the biochemical oxygen demand level of the aqueous waste stream based on at least the processing cost and the recovery value.

28. The method of claim 27, further comprising:
generating an invoice reflecting the adjusted contract price.

29. The method of claim 27, wherein at least one of the calculating the processing cost and the calculating the recovery value is performed substantially continuously when the biochemical oxygen demand level of the aqueous waste stream is being reduced.

30. The method of claim 27, wherein calculating the processing cost includes:
receiving a first signal associated with a flow rate of the aqueous waste stream into a waste water treatment system;
receiving a second signal associated with the input biochemical oxygen demand level of the aqueous waste stream;
calculating a plurality of processing costs as a function of time, each processing cost from the plurality of processing costs being calculated based on the first signal and the second signal; and
calculating an arithmetic mean of the plurality of processing costs for predetermined time period.

31. The method of claim 27, wherein the calculating the recovery cost includes:
receiving a signal associated with a flow rate of the bacterial mass removed from the aqueous waste stream;
receiving a signal associated with a protein content of the bacterial mass removed from the aqueous waste stream; and
receiving input associated with a market price for animal feed.

32. The method of claim 27, wherein at least one of the calculating the processing cost and the calculating the recovery value includes calculating a mean cell retention time of the bacterial mass within a waste water treatment system.

33. The method of claim 27, wherein at least one of the calculating the processing cost and the calculating the recovery value includes calculating a mean waste residence time of the bacterial mass mean.

34. A method, comprising:
calculating a processing cost associated with a process of reducing a biochemical oxygen demand level of an aqueous waste stream from an input biochemical oxygen demand level to an output biochemical oxygen demand level;
calculating a recovery value associated with a bacterial mass removed from the aqueous waste stream during the process; and
adjusting automatically a portion of the process based on at least the processing cost and the recovery value.

35. The method of claim 34, wherein the adjusting includes:
adjusting a target mean cell retention time of the bacterial mass within a waste water treatment system; and
transmitting a pump control signal to a variable-speed pump disposed within the waste water treatment system.

36. The method of claim 34, wherein the adjusting includes:
adjusting a target mean waste retention time of the bacterial mass within a waste water treatment system; and
transmitting a pump control signal to a variable-speed pump disposed within the waste water treatment system.

37. A wastewater treatment unit comprising:
a growth vessel;
means for adding an aqueous waste stream comprising metabolizable components to the growth vessel;
at least one bacterial culture in the growth vessel, which metabolizes at least a portion of the metabolizable components of the aqueous waste stream, thereby forming a bacterial suspension in an aqueous bulk liquid, wherein the aqueous bulk liquid is depleted of metabolizable components relative to the aqueous waste stream;
means for aerating the bacterial suspension and aqueous bulk liquid in the growth vessel;
means for separating a portion of the bacterial suspension from the aqueous bulk liquid, thereby forming a bacterial mass;
means for removing the bacterial mass from the wastewater treatment unit;
means for adjusting the rate at which the bacterial mass is removed to provide a MCRT of the bacteria in the wastewater treatment unit of no more than about 8 days;
means for removing a portion of the aqueous bulk liquid from the wastewater treatment unit, wherein said aqueous bulk liquid is substantially free of total suspended solids;
means for drying the removed bacterial mass; and
means for adjusting the time period in which the removed bacterial mass is dried whereby MWRT−MCRT≦about 2 days.

38. The wastewater treatment unit of claim 37, wherein the means for separating is selected from the group consisting of a clarifier vessel, a dissolved air flotation vessel, or a membrane bioreactor, wherein the clarifier vessel, dissolved air flotation vessel, and membrane bioreactor are connected to the growth vessel with means for recycling the bacterial suspension in the aqueous bulk liquid between the growth vessel and the clarifier vessel, dissolved air flotation vessel, or membrane bioreactor.

39. The wastewater treatment unit of claim 37, further comprising means for dewatering disposed between the means for removing the bacterial mass and the means for drying the removed bacterial mass.

40. The wastewater treatment unit of claim 37, wherein said at least one bacterial culture comprises bacteria selected from the group consisting of genetically modified bacteria, Micrococci, Bacilli, Flavobacteria, methanogens, *Pseudomonas, Nitrosomonas*, Nitrobacteria, nitrifying bacteria, aerobic heterotrophs, and combinations thereof.

41. A method comprising:
receiving an aqueous waste stream from a food and/or beverage processing plant comprising dissolved or suspended metabolizable food and/or beverage byproducts with BOD levels of ≧ about 100 mg/L;
adding the aqueous waste stream comprising metabolizable components to a growth vessel containing at least one bacterial culture, at a first flow rate;
allowing the bacteria of the at least one bacterial culture to grow in the growth vessel by metabolizing at least a portion of the metabolizable components of the aqueous waste stream, thereby forming a bacterial suspension in an aqueous bulk liquid, wherein the aqueous bulk liquid is depleted of metabolizable components relative to the aqueous waste stream;
separating a portion of the bacterial suspension from the aqueous bulk liquid, thereby fowling a bacterial mass;
removing the bacterial mass at a second flow rate;
removing a portion of the aqueous bulk liquid at a third flow rate, wherein the aqueous bulk liquid is substantially free of total suspended solids and has a BOD within permitted levels;
adjusting the second flow rate to provide a MCRT of the bacteria of no more than about 8 days; and
drying the removed bacterial mass within a time period whereby MWRT−MCRT≦about 2 days;
providing the dried bacterial mass as a protein source for animal feed.

42. The method of claim 41, wherein said dried bacterial mass is provided to animal feed producers as a replacement for fish meal in animal feeds.

43. The method of claim 41, wherein said the bacterial mass is dried to a solids content of 80% or more and is provided as an animal feed ingredient.

44. The method of claim 41, further comprising:
determining the protein content of the dried bacterial mass,
diverting bacterial mass having a protein content >40% to a storage vessel:
diverting bacterial mass having a protein content <40% to a waste vessel; and
providing the bacterial mass with a protein content >40% as a protein source for animal feed.

45. A composition comprising:
a dried and deactivated bacterial mass comprising a mixture of bacteria, wherein the true protein content is at least about 50%, wherein the dried bacterial mass is suitable for use as a feed for animals used for human consumption and complies with the requirements of the American Association of Feed Control Officials Official Publication (2007), wherein the amino acid levels, total amino acid levels, and crude protein levels are at least those in the following table:

| Amino Acid | % of sample |
| --- | --- |
| Alanine | 4.65% |
| Arginine | 2.02% |
| Aspartic Acid | 5.43% |
| Glutamic Acid | 4.12% |
| Glycine | 3.46% |
| Histidine | 0.86% |
| Isoleucine | 2.26% |
| Leucine | 3.57% |
| Lysine | 2.57% |

-continued

| Amino Acid | % of sample |
|---|---|
| Methionine | 1.25% |
| Cystine | 0.31% |
| Phenylalanine | 2.07% |
| Proline | 2.19% |
| Serine | 1.45% |
| Threonine | 3.21% |
| Tryptophan | 0.74% |
| Tyrosine | 2.18% |
| Valine | 3.13% |
| Total | 45.47% |
| Crude Protein | 53.80% |
| stated. | |

46. A composition comprising:

a dried and deactivated bacterial mass comprising a mixture of bacteria, wherein the true protein content is at least about 50%, wherein the dried bacterial mass is suitable for use as a feed for animals used for human consumption and complies with the requirements of the American Association of Feed Control Officials Official Publication (2007), wherein the amino acid levels are at least those in the following table:

| Amino Acids | % of Sample |
|---|---|
| Alanine | 3.82% |
| Arginine | 3.60% |
| Aspartic Acid | 6.36% |
| Glutamic Acid | 8.04% |
| Glycine | 2.81% |
| Histidine | 1.46% |
| Isoleucine | 3.38% |
| Leucine | 5.06% |
| Lysine | 4.34% |
| Methionine | 1.41% |
| Cysteine | 0.55% |
| Phenylalanine | 3.29% |
| Proline | 2.77% |
| Serine | 2.82% |
| Threonine | 3.11% |
| Tryptophan | 0.98% |
| Tyrosine | 2.83% |
| Valine | 3.52% |
| Total | 60.15%. |

\* \* \* \* \*

UNITED STATES PATENT AND TRADEMARK OFFICE
CERTIFICATE OF CORRECTION

| | | |
|---|---|---|
| PATENT NO. | : 7,931,806 B2 | Page 1 of 1 |
| APPLICATION NO. | : 12/262971 | |
| DATED | : April 26, 2011 | |
| INVENTOR(S) | : Andrew J. Logan | |

It is certified that error appears in the above-identified patent and that said Letters Patent is hereby corrected as shown below:

Title page, item (73)    Assignee:    replace "Oberon Frm, Inc." with --Oberon FMR, Inc.--.

Signed and Sealed this
Fifth Day of June, 2012

David J. Kappos
*Director of the United States Patent and Trademark Office*